United States Patent [19]
Taniguchi et al.

[11] Patent Number: 5,961,418
[45] Date of Patent: Oct. 5, 1999

[54] INFINITELY VARIABLE TRANSMISSION

[75] Inventors: Takao Taniguchi; Shoichi Miyagawa; Kazumasa Tsukamoto; Shiro Sakakibara; Takeshi Inuzuka; Masashi Hattori; Hirofumi Nozawa, all of Anjo, Japan

[73] Assignee: Aisin Aw Co., Ltd., Anjo, Japan

[21] Appl. No.: 08/957,772

[22] Filed: Oct. 24, 1997

[30] Foreign Application Priority Data

Oct. 25, 1996 [JP] Japan .................................. 8-284279

[51] Int. Cl.⁶ .................................................. F16H 37/02
[52] U.S. Cl. .................................. 477/47; 477/43; 477/46
[58] Field of Search .............................. 477/40, 43, 44, 477/45, 46, 47, 48, 906

[56] References Cited

U.S. PATENT DOCUMENTS

| | | |
|---|---|---|
| 4,644,820 | 2/1987 | Macey et al. . |
| 5,052,247 | 10/1991 | Kato et al. .............................. 477/46 X |
| 5,086,672 | 2/1992 | Kato et al. .............................. 477/45 X |
| 5,527,231 | 6/1996 | Seidel et al. .............................. 477/46 |
| 5,569,114 | 10/1996 | Matsuda et al. ....................... 477/48 X |
| 5,662,547 | 9/1997 | Moroto et al. ............................. 477/48 |
| 5,776,028 | 7/1998 | Matsuda et al. ............................. 477/45 |

FOREIGN PATENT DOCUMENTS

| | | |
|---|---|---|
| A2-0 733 829 | 9/1996 | European Pat. Off. . |
| A 6-331000 | 11/1994 | Japan . |
| 7-66234 | 3/1995 | Japan . |
| 7-128701 | 5/1995 | Japan . |
| A 7-139608 | 5/1995 | Japan . |
| 7-327663 | 12/1995 | Japan . |

OTHER PUBLICATIONS

SAE 1991 Transaction Journal of Passenger Cars, vol. 100, No. sect. 6, Apr. 9, 1991, "Modeling, Simulation, and Control Implementation for a Split–Torque, Geared Neutral, Infinitely Variable Transmission", Vahabzadeh and Linzell, pp. 552–557.

*Primary Examiner*—Dirk Wright
*Assistant Examiner*—Peter T. Kwon
*Attorney, Agent, or Firm*—Oliff & Berridge, PLC

[57] ABSTRACT

An infinitely variable transmission has a gear neutral (GN) point and serves as an output member by torque circulation. When a pulley ratio thereof is within a predetermined range from the GN point, a coasting state occurs which may hinder smooth torque transmission based on the transmission efficiency and generate a great engine braking effect (failure in the transmission resulting from the coasting state) based on a large gear ratio. When the pulley ratio assumes a predetermined value that may cause failure in transmission resulting from the coasting state, upon release of the accelerator pedal, an electronic throttle system performs control such that the engine outputs a predetermined torque. Thus a positive driving state is always established. In this state, the continuously variable transmission (CVT) is shifted in the upshift direction to escape rapidly from a range defined by the pulley ratio of the predetermined value.

11 Claims, 22 Drawing Sheets

Table Showing Clutch Engagement States

| Range | Clutch | C<sub>L</sub> | C<sub>H</sub> |
|---|---|---|---|
| P | | | |
| R | | ○ | |
| N | | | |
| D | Low | ○ | |
| | High | | ○ |

- Single Chamber Type for Setting Area Difference -

Throttle Opening Set by Electronic Throttle System

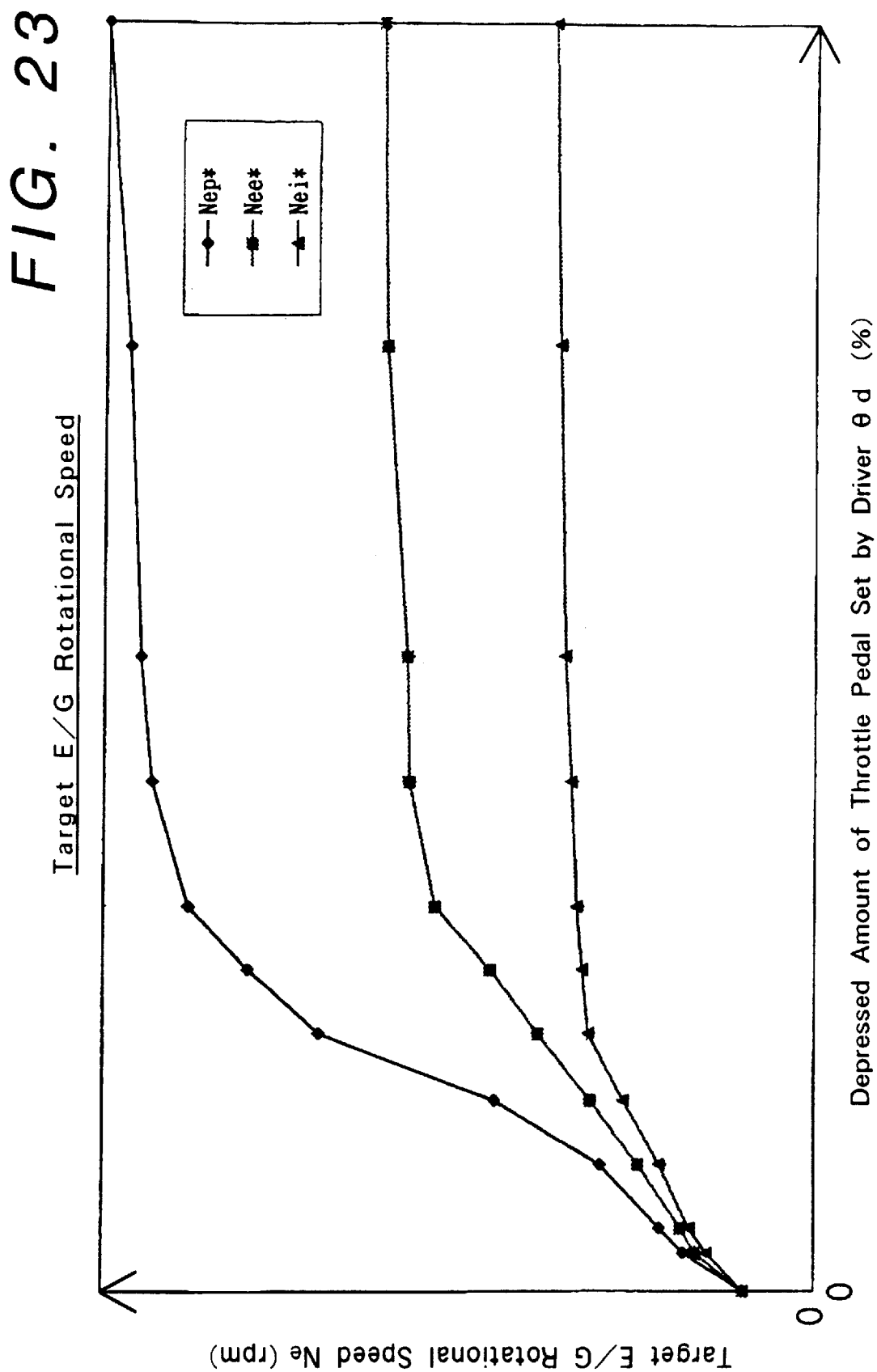

INFINITELY VARIABLE TRANSMISSION

BACKGROUND OF THE INVENTION

1. Field of Invention

The invention relates to an infinitely variable transmission (IVT) that establishes torque circulation in combination with a planetary gear set and, more specifically, to an infinitely variable transmission that establishes a neutral state using the torque circulation.

2. Description of Related Art

Recently, because of demands for significant improvements in fuel consumption as well as driving performance, an automatic transmission equipped with a belt-type continuously variable transmission (CVT) is drawing attention as being used for motor vehicles.

Conventionally, Japanese Patent Application Laid-Open No. 6-331000 discloses an infinitely variable transmission (IVT) having a continuously variable transmission, a constant-speed mechanism and a planetary gear mechanism for synthesizing power transmitted from the continuously variable transmission and the constant-speed mechanism. The infinitely variable transmission generates a torque circulation. Thereby the amplification of the speed-change amplitude is achieved. In this infinitely variable transmission, the engine output is transmitted to a carrier through the constant-speed mechanism, and it is also transmitted to a sun gear through the continuously variable transmission and a first (low) clutch or one-way clutch. In this state, the torque circulation occurs in the infinitely variable transmission. As the speed-change ratio of the continuously variable transmission increases from a small value (O/D) to a large value (U/D), the speed-change ratio of the output shaft of the infinitely variable transmission to the ring gear also changes. Namely, it changes from a value corresponding to the rearward movement, through infinity (the output rotation is null) and a large value corresponding to the forward movement, and to a small value corresponding to the forward movement. Furthermore, when the first clutch or one-way clutch is disengaged and a second (high) clutch is engaged, the rotation from the continuously variable transmission is directly transmitted to the output shaft. As the speed-change ratio of the continuously variable transmission decreases from a large value (U/D) to a small value (O/D), the rotational ratio of the output shaft also decreases from a large value (U/D) to a small value (O/D).

The infinitely variable transmission for generating torque circulation makes it possible to locate geometrically a gear neutral position where the rotation of the output shaft becomes zero. This is achieved by setting the speed-change ratio of the continuously variable transmission to a predetermined value determined by the gear ratio of the planetary gear mechanism. Therefore this infinitely variable transmission theoretically obviates starting devices, such as a clutch or a torque converter.

When this infinitely variable transmission with torque circulation is in a drive state where torque is transmitted from the engine to the wheels in the vicinity of the gear neutral position, it is able to obtain a high torque ratio. However, when this infinitely variable transmission is in a coasting state where torque is transmitted from the wheels to the engine, it obtains an extraordinarily large gear ratio (gear ratio at a speed stage lower than the first speed stage of a conventional automatic transmission). This state generates a great engine braking effect and hinders smooth torque transmission based on the transmission efficiency of the transmission.

In particular, when the vehicle needs to start, move slowly forward and stop repeatedly in traffic congestion, it is necessary to turn the accelerator pedal on and off repeatedly with the gear ratio being within a range not far from the gear neutral position. This leads to a very awkward movement of the vehicle, which is annoying to the driver.

In order to prevent such a problem, it may be considered to provide a one-way clutch in a power transmission path in order to eliminate the power transmission caused by the coasting state or temporarily cause the first (low) clutch to be disengaged or slip. However, this would require the entire transmission to be large or a complicated control mechanism for switching over the operation of the one-way clutch or controlling slipping of the first clutch.

SUMMARY OF THE INVENTION

It is thus an object of the invention to provide an infinitely variable transmission that is capable of solving the aforementioned problems with a comparatively simple structure. This is achieved by controlling the output of the driving source to avoid the coasting state when the rotational ratio is within a range which may generate a great engine braking effect caused by the coast torque and hinder smooth torque transmission based on the transmission efficiency.

In order to achieve the aforementioned object, an infinitely variable transmission is provided which includes an input shaft connected to an output shaft of a power source; an output member connected to wheels; a continuously variable transmission having a first rotating member connected to the input shaft, a second rotating member, and speed-change operating means for changing a rotational ratio of the first rotating member to the second rotating member; a planetary gear set having at least first, second and third rotating elements, the first, second and third rotating elements being connected to the input shaft, the second rotating member and the output member respectively, so as to change a torque transmitting direction between both the rotating members based on changes in the rotational ratio of the continuously variable transmission, and to change a torque transmitting direction for transmitting output torque of the output member; and power control means for controlling output of the power source. The power control means establishes a positive driving state where torque is transmitted from the power source to the wheels when the rotational ratio of the continuously variable transmission is within a predetermined range from a neutral position where rotation of the output member becomes zero, if the output torque of the power source is smaller than a predetermined value that establishes a negative driving state where torque is transmitted from the wheels to the power source.

The speed-change operating means controls the apparatus such that the rotational ratio of the continuously variable transmission escapes from the predetermined range when a brake pedal is not depressed while the power control means is in operation.

The speed-change operating means controls the apparatus such that the rotational ratio of the continuously variable transmission escapes from the predetermined range at a maximum speed.

The continuously variable transmission includes a belt-type continuously variable transmission having first and second pulleys, a belt wound around both the first and second pulleys, and hydraulic actuators applying axial force to the first and second pulleys, and the speed-change operating means controls the apparatus such that the pulley ratio of the belt-type continuously variable transmission escapes from the predetermined range at the maximum speed, by supplying a maximum fluid pressure to one of the hydraulic actuators.

The power source is an engine, and the power control means controls the throttle opening of the engine.

The throttle opening is controlled in accordance with engine rotational speed so that the engine outputs a predetermined torque.

In the aforementioned structure, the output rotation inputted to the input shaft from the power source such as the engine is suitably adjusted by the continuously variable transmission, for example, of a belt type. It is then transmitted to the second rotating element of the planetary gear set. On the other hand, a constant rotation is transmitted to the first rotating element. Both the rotations are synthesized in the planetary gear set and then transmitted through the third rotating element and the output member to the wheels to be driven. The torque circulation occurs subsequently. In this state, in accordance with the rotational ratio of the continuously variable transmission, the rotating direction of the output member is switched over to the positive or negative side, intervened by the neutral position where the rotation of the output member becomes zero.

When the output torque of the power source is smaller than the predetermined value with the rotational ratio is within the predetermined range from the neutral position, the vehicle decelerates by inertia or braking operation. This range may generate a great engine braking effect or hinder smooth torque transmission. In this state, the power control means establishes the positive driving (drive) state where. torque is always transmitted from the power source to the wheels. When an accelerator operating means such as the accelerator pedal is out of operation, the output torque of the power source such as the engine is smaller than the predetermined value. However, even if the accelerator pedal or similar device is slightly depressed, due to the transmission efficiency of the infinitely variable transmission, there is a range where the negative driving state is established. The predetermined value corresponds to a threshold value of the output torque of the engine or similar device for establishing the negative driving state.

BRIEF DESCRIPTION OF THE DRAWINGS

The invention will be described reference to the drawings in which:

FIG. 17 is a time chart for the coast avoidance control when the brake pedal is turned on;

FIG. 23 illustrates the target engine rotational speed in the respective states.

DETAILED DESCRIPTION OF PREFERRED EMBODIMENTS

Figure 1:
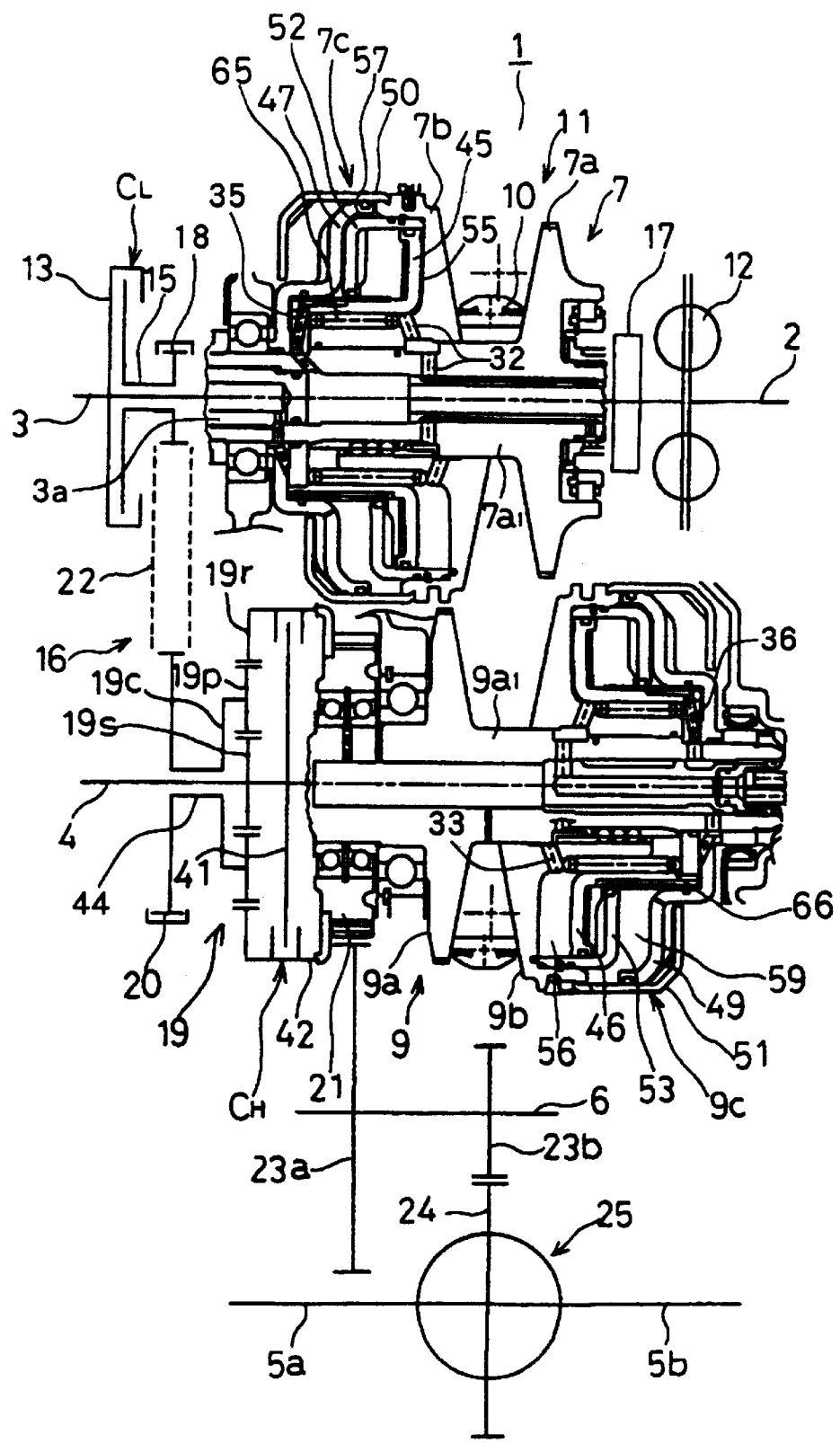
FIG. 1 is a front sectional view of an infinitely variable transmission according to the invention.

Preferred embodiments of the invention will now be described with reference to the accompanying drawings. As shown in FIG. 1, an infinitely variable transmission 1 for use with motor vehicle includes a first shaft 3 aligned with an engine crankshaft 2, a second shaft 4, a third shaft 5(a, b) aligned with a front axle, and a fourth shaft 6 that includes a countershaft. A primary (first) pulley 7 is disposed on the first shaft 3, and a secondary (second) pulley 9 is disposed on the second shaft 4. A belt 10 is wound around both the pulleys 7, 9, thus providing a belt-type continuously variable transmission 11.

In addition, the first shaft 3 is directly connected to the engine crankshaft 2 through a damper device 12 for absorbing engine torque fluctuations, so that the first shaft 3 constitutes an input shaft. The input shaft 3 includes a shaft 3a that is spline-fitted to a stationary sheave 7a of the primary pulley 7 and a boss portion 7a1 of the stationary sheave 7a. An input-side member 13 of a low clutch $C_L$ is fixed to the shaft 3a constituting the input shaft 3, and an output member 15 of the low clutch $C_L$ is rotatably supported on the input shaft 3. The output member 15 is integrally connected to a primary-side sprocket 18, which constitutes a constant-speed transmission device 16. The stationary sheave 7a of the primary pulley 7, which constitutes the input shaft 3, is connected to an oil pump 17. A movable sheave 7b is axially movably supported on the stationary sheave 7a through a hydraulic actuator 7c, which will be described later.

The second shaft 4 includes a stationary sheave 9a of the secondary pulley 9. A movable sheave 9b is axially movably supported on the stationary sheave 9a through a hydraulic actuator 9c. Furthermore, a high clutch $C_H$ and a planetary gear set 19 are disposed on the second shaft 4, and a secondary-side sprocket 20 and an output gear (output member) 21 are also rotatably supported on the second shaft 4.

The planetary gear set 19 is a single planetary gear set having a sun gear 19s, a ring gear 19r and a carrier 19c that rotatably supports a pinion 19p engaged with both the gears 19s, 19r. The sun gear 19s is connected to the stationary sheave 9a of the secondary pulley 9 constituting the second shaft 4, thus forming a second rotating element. The ring gear 19r is connected to the output gear 21, thus forming a third rotating element. The carrier 19c is connected to the secondary-side sprocket 20, thus forming a first rotating element. A wound-around body 22, which may be a chain such as a silent chain or roller chain or a timing belt, is wound around the primary-side and secondary-side sprockets 18, 20. The high clutch $C_H$ is interposed between the sun gear 19s and the ring gear 19r.

The output gear (output member) 21 is engaged with a large gear 23a of the countershaft 6 constituting the fourth shaft, and small gear 23b of the countershaft 6 is engaged with a ring gear 24 of a differential device 25. The differential device 25 outputs differential rotations respectively to the left and right axle shafts 5a, 5b, which constitute the third shaft.

The hydraulic actuators 7c, 9c of the primary and secondary pulleys 7, 9 are provided with partition members 45, 46, cylinder members 47, 49, drum members 50, 51 and second piston members 52, 53 respectively. The partition members 45, 46 and the cylinder members 47, 49 are fixed to the boss portions 7a1, 9a1 of the stationary sheaves 7a, 9a respectively while the drum members 50, 51 and the second piston members 52, 53 are fixed to the movable sheaves 7b, 9b on the back surfaces thereof respectively. The partition members 45, 46 are oil-tightly fitted to the second-piston members 52, 53 respectively. These second piston members 52, 53 are in turn oil-tightly fitted to the cylinder members 47, 49 and the partition members 45, 46 respectively, thereby providing double piston (double chamber) structures, which include first hydraulic chambers 55, 56 and second hydraulic chambers 57, 59 respectively.

In the first hydraulic chambers 55, 56 of the hydraulic actuators 7c, 9c, each back surface of the movable sheaves 7b, 9b constitutes a piston surface. The effective pressurized area of the primary-side piston surface is the same as that of the secondary-side piston surface. Furthermore, the boss portions 7a1, 9a1 of the primary-side and secondary-side stationary sheaves 7a, 9a are provided with hydraulic paths 32, 33 and hydraulic paths 35, 36 respectively. The hydraulic paths 32, 33 are connected to the first hydraulic chambers 55, 56 respectively, while the hydraulic paths 35, 36 are connected to the second hydraulic chambers 57, 59 respectively. In order to urge the primary-side and secondary-side movable sheaves 7b, 9b towards the stationary sheaves 7a, 9a respectively, pre-loading springs 65, 66 are provided respectively in a compressed state.

The operation based on the infinitely variable transmission 1 will now be described with reference to FIGS. 1, 2 and 3. The rotation of the engine crankshaft 2 is transmitted to the input shaft 3 through the damper device 12. In a low mode of the D range where the low clutch $C_L$ is engaged and the high clutch $C_H$ is disengaged, the rotation of the input shaft 3 is transmitted to the primary pulley 7, and it is also transmitted to the carrier 19c of the planetary gear set 19 through the constant-speed transmission device 16 that includes the primary-side sprocket 18, the wound-around body 22 and the secondary-side sprocket 20. On the other hand, due to the fact that the later-described hydraulic actuators 7c, 9c suitably adjust the pulley ratio of the primary pulley 7 to the secondary pulley 9, the rotation of the primary pulley 7 is continuously changed and transmitted to the secondary pulley 9. The rotation of the secondary pulley 9 is further transmitted to the sun gear 19s of the planetary gear set 19.

The planetary gear set 19 will now be described with reference to the velocity diagram of FIG. 2. The carrier 19c, to which a constant rotation is transmitted through the constant transmission device 16, serves as a reaction force element. The continuously changed rotation is transmitted from the belt-type continuously variable transmission 11 to the sun gear 19s. The rotation of the carrier 19c and that of the sun gear 19s are synthesized and then transmitted to the output gear 21 through the ring gear 19r. Since the output gear 21 is connected to the ring gear 19r, which is a rotating element rather than a reaction force supporting element, the planetary gear set 19 generates torque circulation and the sun gear 19s and the carrier 19c rotate in the same direction. Therefore, the output shaft 5 rotates both in the positive (Low) and reverse (Rev) directions including a state of zero-rotation. That is, in accordance with the torque circulation, when the output shaft 5 rotates in the forward direction, the belt-type continuously variable transmission 11 transmits torque from the secondary pulley 9 to the primary pulley 7. Conversely, when the output shaft 5 rotates in the reverse (rearward) direction, torque is transmitted from the primary pulley 7 to the secondary pulley 9.

In a high mode where the low clutch $C_L$ is disengaged and the high clutch $C_H$ is engaged, the torque transmission to the planetary gear set 19 is disconnected, and the planetary gear set 19 rotates integrally due to the engagement of the high clutch $C_H$. Accordingly, the rotation of the input shaft 3 is transmitted to the output gear 21 exclusively through the belt-type continuously variable transmission (CVT) 11 and the high clutch $C_H$. Furthermore, the rotation of the output gear 21 is transmitted to the differential device 25 through the gears 23a, 23b of the countershaft 6 and then to both the front wheels through the left and right axle shafts 5a, 5b.

Figure 4:
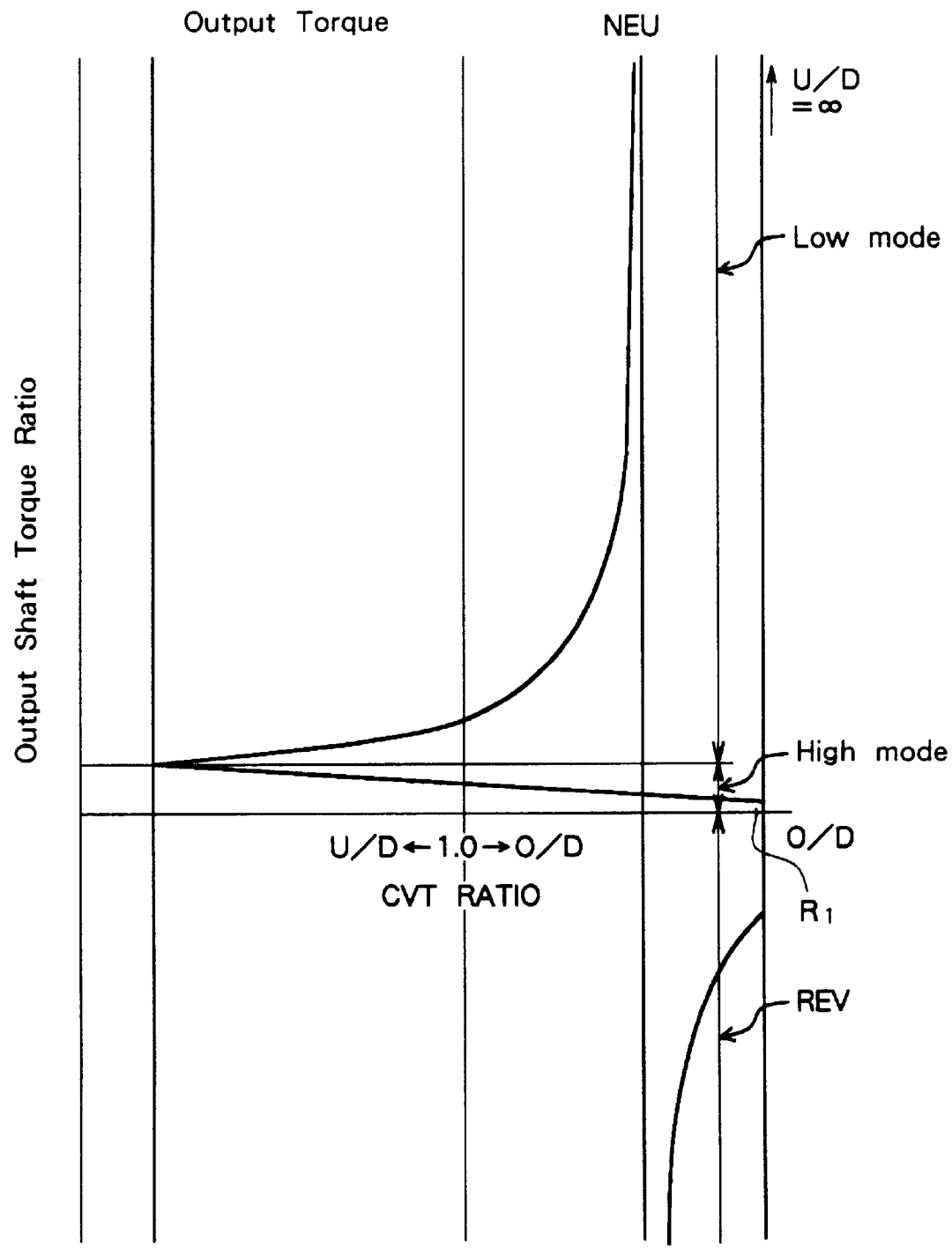
FIG. 4 is a graph indicating the change of the output torque with respect to the torque ratio of the belt-type continuously variable transmission (CVT)
Figure 5:
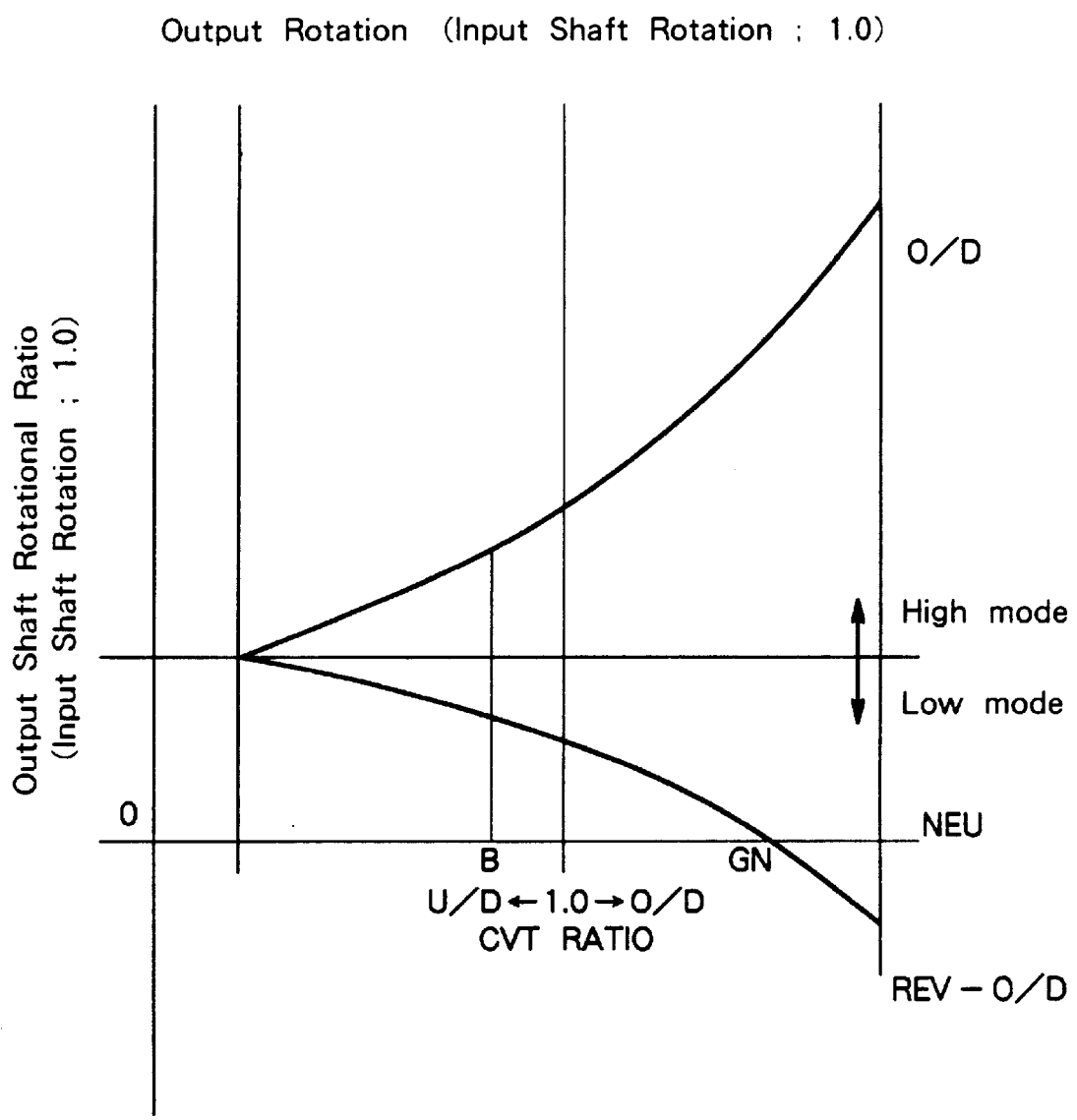
FIG. 5 is a graph indicating the change of the output rotational speed with respect to the torque ratio of the CVT.

The following description will be made referring to the velocity diagram of FIG. 2, an output graph of FIG. 4 and a rotation graph of FIG. 5. In the low mode, when the belt-type continuously variable transmission (hereinafter referred to as CVT) 11 reaches a limit (O/D end) in the speed increase direction (see line a in FIG. 2), the rotation of the sun gear 19s reaches its maximum. Thus the ring gear 19r rotates in the reverse direction, and the carrier 19c rotates at a constant speed. This reverse rotation of the ring gear 19r is transmitted to the output shaft 21. Then the CVT 11 is shifted in the speed decrease (U/D) direction, thus decreasing the rotation in the reverse direction. Consequently, a neutral position (NEU) where the rotation of the output gear 21 becomes zero is reached with a predetermined pulley ratio determined by a gear ratio of the planetary gear set 19 to the constant-speed transmission device 16. Furthermore, since the CVT 11 is shifted in the speed decrease (U/D) direction, the ring gear 19r starts to rotate in the positive direction. Thus this positive rotation, that is, the forward rotation is transmitted to the output gear 21. As best seen in FIG. 4, in the vicinity of the aforementioned neutral position (NEU), the torque of the output gear 21 diverges into infinity.

When the CVT 11 reaches a limit (U/D end) in the speed decrease direction, the high clutch CH is engaged to achieve the high mode. In the high mode, the output rotation of the CVT 11 is directly transmitted to the output gear 21, as indicated by a horizontal line b in the speed graph of FIG. 2. As the CVT 11 is shifted, in turn, in the speed increase (O/D) direction, the rotation of the output gear 21 also starts to increase, thereby reducing the torque to be transmitted correspondingly. The symbol in FIG. 2 represents a ratio (Zs/Zr) of the number Zs of teeth of the sun gear 19s to the number Zr of teeth of the ring gear 19r.

Figures 2, 3:
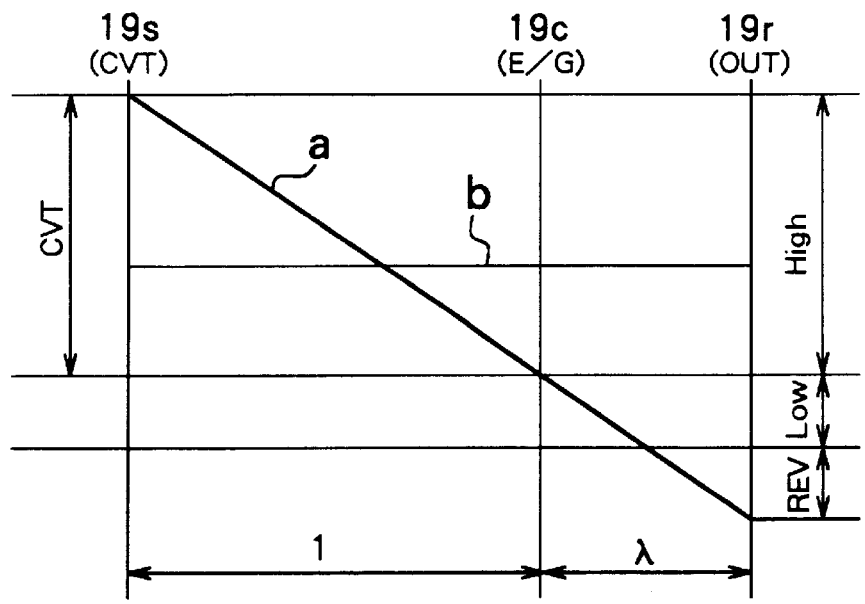
FIG. 2 is a velocity diagram of the infinitely variable transmission.
FIG. 3 shows the engagement states of the clutches.

Referring to FIG. 3, in the P (parking) range and the N (neutral) range, both the low clutch $C_L$ and the high clutch $C_H$ are disengaged to disconnect the power transmission from the engine. In the P (parking) range, the differential device 25 is locked, so that the axle shafts 5a, 5 b are locked.

A hydraulic control mechanism 70 according to this embodiment of the invention will now be described with reference to FIG. 6. The hydraulic control mechanism 70 includes a primary regulator valve 71, a ratio control valve 72, a downshift relief valve 73, a manual valve 75, a low-high control valve 76, a low clutch relief valve 77 and a clutch modulation valve 79. The hydraulic control mechanism 70 further includes a ratio-sensing valve 80 as a restriction means, a sensor shoe 81 as a pulley ratio detecting means and an interlock rod 82 as a locking means.

The sensor shoe 81 is slidably supported by a guide member 83 that is arranged parallel to the shaft of the primary pulley 7. The sensor shoe 81 has two connecting portions 81b, 81c projecting therefrom. One of the connecting portions 81b is engaged with the movable sheave 7b of the primary pulley 7 while the other 81c is engaged with the ratio-sensing valve 80. Accordingly, when the movable sheave 7b moves in the O/D or U/D direction along the shaft, the amount of movement thereof is directly transmitted to the ratio-sensing valve 80 through the sensor shoe 81.

The sensor shoe 81 has a recess portion 81 a formed therein, with which a base end portion 82a of the interlock rod 82 is selectively engaged. The interlock rod 82 penetrates a valve body, and is provided with a leading end portion 82b that is selectively engaged with recess portions 76a, 76b of the low-high control valve 76. Although FIG. 6 shows the base end portion 82a and the leading end portion 82b of the interlock rod 82 separately, these portions 82a, 82b are actually integrally connected to each other. When the base end portion 82a of the interlock rod 82 is engaged with the recess portion 81a of the sensor shoe 81, the leading end portion 82b abuts a surface of the low-high control valve 76 without being engaged with the recess portions 76a or 76b thereof. On the contrary, when the base end portion 82a is disengaged from the recess portion 81a of the sensor shoe 81 and abuts a surface thereof, the leading end portion 82b is engaged with either of the recess portions 76a, 76b of the low-high control valve 76.

In the neutral state, the hydraulic control mechanism 70 supplies a fluid pressure to both the primary-side and secondary-side first hydraulic chambers 55, 56, and releases the fluid pressures supplied to both the primary-side and secondary-side second hydraulic chambers 59, 57. When the vehicle starts from this neutral state, if the vehicle moves forward, the CVT 11 is shifted in the U/D direction to supply a fluid pressure to the secondary-side second hydraulic chamber 59. On the other hand, when the vehicle moves rearward, the CVT 11 is shifted in the O/D direction to supply a fluid pressure to the primary-side second hydraulic chamber 57. In this case, when the low-high control valve 76 is switched over due to a computer malfunction, the vehicle may move rearward, for example, in the D range. In order to securely prevent the vehicle from moving rearward, the ratio-sensing valve 80 does not enable the downshift operation as long as the CVT is engaged in a predetermined forward range, and the switching-over of the low-control valve 76 is mechanically restricted by the interlock rod 82. More specifically, the infinitely variable transmission performs various controls, depending on whether the pulley ratio is greater (on the U/D side) or smaller (on the O/D side) than a predetermined pulley ratio B, which is slightly greater than 1.0 in the forward range as illustrated in FIG. 5. When the pulley ratio is smaller than the predetermined pulley ratio B, the switching-over of the aforementioned controls ensures that the downshift operation in the low mode of the D range or in the R range as well as the jumping operation from the high mode of the D range into the low mode of the D range or the R range will not be allowed.

The operation of the hydraulic control mechanism 70 in accordance with this structure will now be described with reference to FIG. 6. The descriptions will be made hereinafter in the order of (1) the low mode of the D range, (2) the high mode of the D range, (3) the R (reverse) range, (4) the N (neutral) range and the P (parking) range. In any of the modes (1) through (4), as illustrated in FIG. 6, the fluid pressure generated by the oil pump 17 is suitably adjusted by the primary regulator valve 71 and outputted from an output port v. The fluid pressure is then supplied to the first hydraulic chambers 55, 56 of the primary-side and secondary-side hydraulic servos 7c, 9c, such that both the hydraulic chambers 55, 56 are supplied with an equal pressure. The fluid pressure is further supplied to the clutch modulation valve 79. Thereafter the fluid pressure outputted from the clutch modulation valve 79 is selectively supplied either to the low clutch $C_L$ or to the high clutch $C_H$.

(1) The Low Mode of the D Range

The first hydraulic chambers 55, 56 are supplied with an equal fluid pressure, and the low clutch $C_L$ engages. Furthermore, a fluid pressure is supplied to the secondary-side second hydraulic chamber 59 during the upshift operation, and it is supplied to the primary-side second hydraulic chamber 57 during the downshift operation only if the pulley ratio is greater than the pulley ratio B. That is, during the upshift operation, the manual valve 75 is switched over to a D range position, thereby connecting ports a, c and e to ports b, d and f respectively. Also, the low-high control valve 76 is switched over to a low mode position, thereby connecting ports h, j, l and g to ports i, k, m and Ex (a drain port) respectively.

Accordingly, the fluid pressure from the clutch modulation valve 79 is supplied through ports a, b of the manual valve 75, ports h, j of the low-high control valve 76 and ports n, o of the low clutch relief valve 77 to the hydraulic servo for the low clutch, so that the low clutch $C_L$ is engaged. The fluid pressure outputted from the output port v of the primary regulator valve 71 is gradually increased by the ratio control valve 72 until it reaches a value corresponding to a target pulley ratio. Then the fluid pressure thus increased is supplied through ports p, q, ports c, d of the manual valve 75 and ports j, k of the low-high control valve 76 to the secondary-side hydraulic chamber 59. In this state, the high clutch $C_H$ is disengaged and connected to the drain port Ex through port g of the low-high control valve 76. The primary-side second hydraulic chamber 57 is connected to the drain port Ex through ports m, l of the low-high control valve 76, ports f, e of the manual valve 75 and port s of the downshift relief valve 73. In performing the upshift operation, as long as the pulley ratio of the CVT 11 does not exceed the predetermined pulley ratio B, the interlock rod 82 mechanically prevents the low-high control valve 76 from being switched over.

Thereby the low clutch $C_L$ engages, and the axial force applied by the secondary-side hydraulic servo 9c becomes greater than that applied by the primary-side hydraulic servo 7c and increases gradually, so that the pulley ratio increases. The hydraulic servo 9c supplies a fluid pressure to both the first and second hydraulic chambers 56, 59 while the hydraulic servo 7c supplies a fluid pressure only to the first hydraulic chamber 55. As the pulley ratio increases, the movable sheave 7b of the primary pulley 7 moves in the U/D direction. In this state, the engine torque transmitted from the input shaft 3 through the low clutch $C_L$ and the constant-speed transmission device 16 to the carrier 19c of the planetary gear set 19 is outputted from the output gear 21 through the ring gear 19r, while being restricted by the CVT 11 through the sun gear 19s due to the predetermined pulley ratio.

Figure 6:
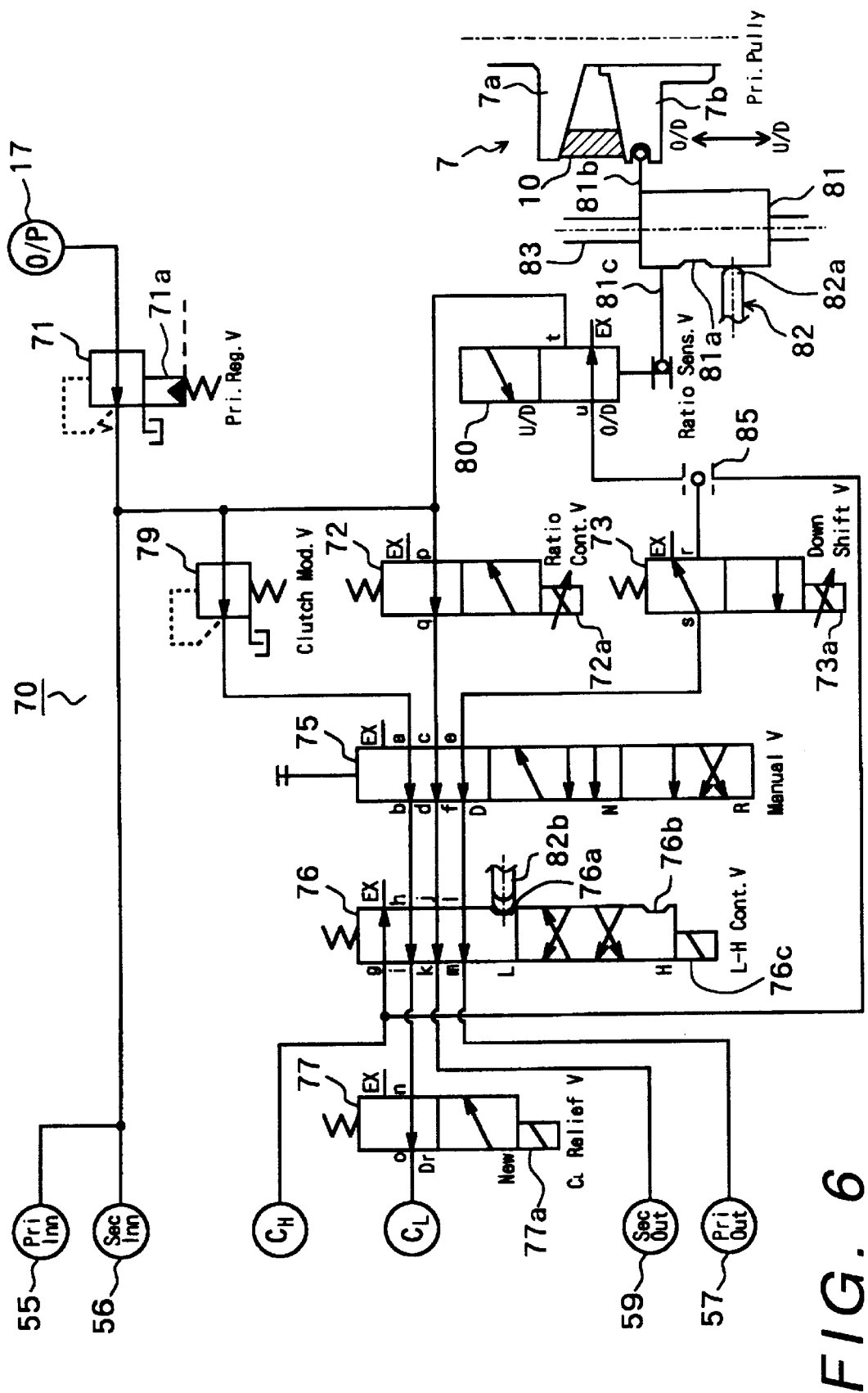
FIG. 6 shows a hydraulic control mechanism that can be employed in the infinitely variable transmission.

During the downshift operation in the low mode of the D range, when the pulley ratio is smaller than the predetermined pulley ratio B, the ratio-sensing valve 80 is brought into a state illustrated in FIG. 6 by the sensor shoe 81. The supply of the fluid pressure outputted from the output port v of the primary regulator valve 79 is disconnected by the ratio-sensing valve 80, thus preventing any more fluid pressure required for the downshift operation from being supplied to the primary-side second hydraulic chamber 57. Also in this case, the fluid pressure supplied to the secondary-side second hydraulic chamber 59 can be drained by connecting port q of the ratio-sensing valve 72 to the drain port Ex, thus allowing the downshift operation to be performed until the neutral state is established. On the other hand, when the pulley ratio is greater than the predetermined pulley ratio B, the ratio-sensing valve 80 or similar device allows the downshift operation to be performed. That is, when the pulley ratio is greater than the predetermined pulley ratio B, the movable sheave 7b of the primary pulley 7 moves in the U/D direction, and the ratio-sensing valve 80 is brought downwards as viewed in FIG. 6 by the sensor shoe 81. Therefore more fluid pressure from the primary regulator valve 71 is supplied to the downshift relief valve 73 through a check valve 85, since ports t, u of the ratio-sensing valve 80 are now connected to each other. Then, by moving the downshift relief valve 73 upwards as viewed in FIG. 6 to connect ports r, s thereof, it becomes possible to supply fluid pressure to the primary-side second hydraulic chamber 57 through ports e, f of the manual valve 75 and ports l, m of the low-high control valve 76.

(2) The High Mode of the D Range

Both the primary-side and secondary-side first hydraulic chambers 55, 56 are supplied with an equal fluid pressure, and the high clutch $C_H$ engages. Furthermore, a fluid pressure is supplied to the primary-side second hydraulic chamber 57 during the upshift operation, and it is supplied to the secondary-side second hydraulic chamber 59 during the downshift operation. That is, during the upshift operation in the high mode of the D range, while the manual valve 75 remains in the D range position as is the case with the low mode, the low-high control valve 76 is switched over to the high mode position, so that ports h, j, l and i are connected to ports g, m, k and Ex (drain port) respectively.

Accordingly, the fluid pressure outputted from the output port v of the primary regulator valve 71 is supplied to the hydraulic servo for the high clutch through ports a, b of the manual valve 75 and ports h, g of the low-high control valve 76, so that the high clutch $C_H$ is engaged. Then the fluid pressure is supplied to the primary-side second hydraulic chamber 57 through ports p, q of the ratio control valve 72, ports c, d of the manual valve 75 and ports j, m of the low-high control valve 76. In this state, the hydraulic servo for the low clutch CL is disengaged and connected to port i of the low-high control valve 76 and the drain port Ex. The secondary-side second hydraulic chamber 59 is connected to the drain port Ex through ports k, l of the low-high control valve 76, ports f, e of the manual valve 75 and port s of the downshift relief valve 73.

Thereby the high clutch $C_H$ engages, and in the CVT 11, the axial force applied by the primary-side hydraulic servo 7c becomes greater than that applied by the secondary-side hydraulic servo 9c. The hydraulic servo 7c supplies a fluid pressure to the first and second hydraulic chambers 55, 57, while the hydraulic servo 9c supplies a fluid pressure only to the first hydraulic chamber 56. By suitably adjusting the ratio control valve 75 with the axial force state corresponding to the torque transmitted from the primary pulley 7 to the secondary pulley 9, the fluid pressure supplied to the second hydraulic chamber 57 by the primary-side hydraulic servo 7c is adjusted. The axial force applied to the primary pulley 7 is thus adjusted to achieve a suitable pulley ratio (torque ratio). In this state, the torque inputted to the input shaft 3 from the engine is suitably changed by the CVT 11, which transmits the torque from the primary pulley 7 to the secondary pulley 9. The torque thus changed is further transmitted to the high clutch $C_H$ and outputted from the output gear 21.

In the high mode of the D range, when the pulley ratio of the CVT 11 is smaller (on the O/D side) than the predetermined pulley ratio B, the interlock rod 82 mechanically prevents the low-high control valve 76 from being switched over to the low mode. Also, if the pulley ratio of the CVT 11 is smaller than the predetermined pulley ratio B, the downshift operation is not prevented, as opposed to the case with the low mode of the D range. That is, even in the high mode of the D range, the supply of the fluid pressure outputted from the output port v of the primary regulator valve 71 is disconnected by the ratio-sensing valve 80 which is in the state illustrated in FIG. 6. Therefore the fluid pressure is not supplied to the secondary-side second hydraulic chamber 59 through the downshift relief valve 73, the manual valve 75 and the low-high control valve 76. Instead, however, the secondary-side second hydraulic chamber 59 is supplied with a fluid pressure that is transmitted from the high clutch $C_H$ through the check valve 85, ports r, s of the downshift relief valve 73, ports e, f of the manual valve 75 and ports 1, k of the low-high control valve 76. Accordingly, the downshift operation can always be performed in the high mode of the D range, regardless of the magnitude of the pulley ratio.

(3) The R Range

In the R range, a predetermined fluid pressure is supplied to the first and second hydraulic chambers 55, 57 of the primary-side hydraulic servo 7c and the first hydraulic chamber 56 of the secondary-side hydraulic servo 9c, and it is also supplied to the hydraulic servo for the low clutch $C_L$. Namely, in the R range, the manual valve 75 assumes an R range position, while the low-high control valve 76 assumes the low mode position. As a result, the fluid pressure outputted from the output port v of the primary regulator valve 71 is supplied to the hydraulic servo for the low clutch $C_L$ through ports a, b of the manual valve 75 and ports h, i of the low-high control valve 76. Also, the fluid pressure is supplied to the primary-side second hydraulic chamber 57 through ports p, q of the ratio control valve 72, ports c, f of the manual valve 75 and ports l, m of the low-high control valve 76. In this case, the port s of the downshift relief valve 73 is connected to the drain port Ex.

Thereby the low clutch $C_L$ engages, and the axial force applied by the primary-side hydraulic servo 7c becomes greater than that applied by the secondary-side hydraulic servo 9c. The hydraulic servo 7c supplies a fluid pressure to the first and second hydraulic chambers 55, 57, while the hydraulic servo 9c supplies a fluid pressure only to the first hydraulic chamber 56. By adjusting the ratio control valve 75 with the axial force state corresponding to the torque transmitted from the primary pulley 7 to the secondary pulley 9, the fluid pressure supplied to the second hydraulic chamber 57 by the primary-side hydraulic servo 7c is adjusted, so that a suitable pulley ratio is achieved. In this state, the pulley ratio of the CVT 11 increases (in the O/D direction) at a predetermined ratio. The engine torque inputted to the input shaft 3 is transmitted to the carrier 19c of the planetary gear set 19 through the low clutch $C_L$ and the constant-speed transmission device 16. The engine torque is also transmitted to the sun gear 19s through the CVT, which transmits the torque from the primary pulley 7 to the secondary pulley 9. The torque thus transmitted to the carrier 19c and the torque thus transmitted to the sun gear 19s are synthesized in the planetary gear set 19 and then, through the ring gear 19r, outputted from the output shaft 5 as a reverse rotation. Also in the R range, as is the case with the low mode of the D range where the pulley ratio is smaller than the predetermined pulley ratio B, the supply of the fluid pressure to the downshift relief valve 73 is disconnected by the sensor shoe 81 and the ratio-sensing valve 80, which prevents the downshift operation. However, since engine braking is essentially not required in the R range, such prevention of the downshift operation does not cause any inconvenience.

(4) The N, P Ranges

When the manual valve 75 assumes a P range position or an N range position, both the low clutch $C_L$ and the high clutch CH are disengaged. The first hydraulic chambers 55, 56 of both the primary-side and secondary-side hydraulic servos 7c, 9c are supplied with a predetermined pressure. That is, in the manual valve 75, ports c, e and b are connected to ports d, f and Ex (drain port) respectively. In this case, the low-high control valve 76 remains in the low mode position. Furthermore, port q of the ratio control valve 72 is connected to the drain port Ex, while the ratio-sensing valve 80 remains in the position illustrated in FIG. 6. Accordingly, both the primary hydraulic servo 7c and the secondary hydraulic servo 9c supply an equal fluid pressure only to the first hydraulic chambers 55, 56 respectively. As a result, the axial force applied to the primary pulley 7 is substantially equal to that applied to the secondary pulley 9.

The following hydraulic control mechanism is explained in detail in Japanese Patent Application No. 7-327663.

The control of the infinitely variable transmission according to this embodiment of the invention will now be described.

Figure 7:
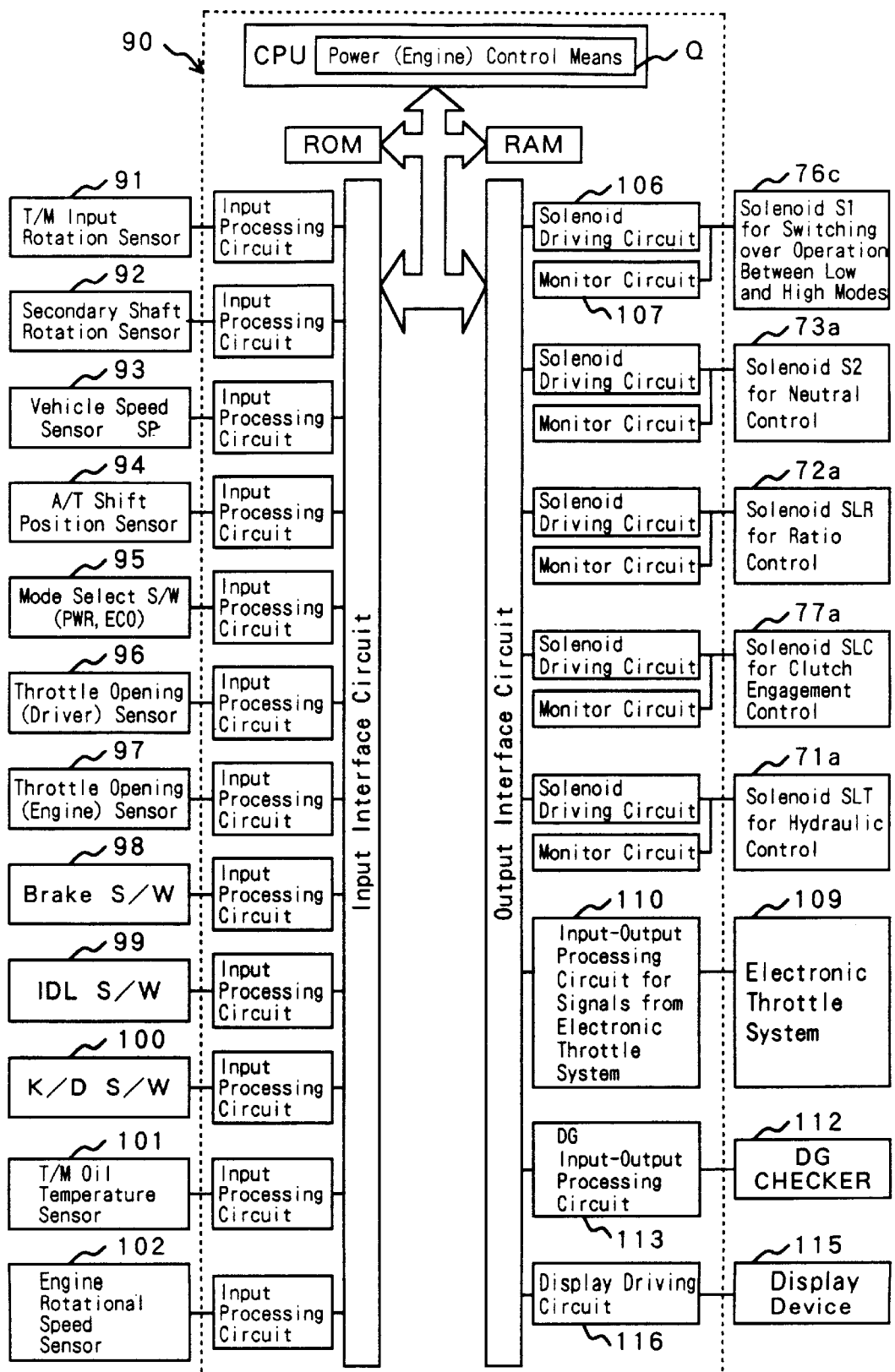
FIG. 7 is a block diagram illustrating an electronic control mechanism.

FIG. 7 is a block diagram showing an electronic control unit (ECU) 90, which includes a plurality of sensors and switches denoted by reference numbers 91 through 102 respectively. Sensor 91 detects the rotation of the input shaft 3 and is installed in the infinitely variable transmission 1. Sensor 92 detects the rotation of the secondary pulley 9 of the CVT 11. Sensor 93 is a vehicle speed sensor for detecting the rotation of the output shaft 5 of the infinitely variable transmission. Sensor 94 detects which shift position P, R, N or D is assumed by a shift lever of the infinitely variable transmission, that is, by the manual valve. Switch 95 is a mode selecting switch for selecting a power mode that is based on maximum power characteristics or an economy mode that is based on optimal fuel consumption characteristics. Sensor 96 detects a throttle opening that is based on an accelerator (throttle) pedal. Sensor 97 detects the actual throttle opening. Sensor switch 98 detects that a brake pedal is depressed. Switch 99 detects that the throttle is in the idling state with the accelerator pedal not being depressed. Switch 100 is a kick-down switch for detecting a fully depressed state of the accelerator pedal. Sensor 101 detects oil temperature in the transmission, and sensor 102 detects the engine rotational speed.

Various signals transmitted from the sensors are inputted into a CPU, ROM or RAM through an input processing circuit and an input interface. The control unit 90, which includes the CPU and similar devices, is provided with a power (engine) control means Q for controlling the engine (power source). The power control means Q controls the engine such that the engine outputs a predetermined torque to achieve the positive driving (drive) state where torque is transmitted from the engine to the wheels. This control is based on a judgment that the pulley ratio of the CVT 11 is smaller than the predetermined value B (1.3, for example) and that the torque outputted from the engine is smaller than a predetermined value for achieving the negative driving (coasting) state where torque is transmitted from the wheels to the power source. The pulley ratio of the CVT 11 is calculated based on the signals from the input rotation sensor 91 and the rotation sensor 92 for the secondary shaft. When the pulley ratio reaches the predetermined value B, smooth torque transmission based on the transmission efficiency may be hindered and a large gear ratio may generate a great engine braking effect. In order to determine whether the engine output torque is smaller than the predetermined value, it is calculated using a map, based on signals from the throttle opening sensor 97 and the engine rotational speed sensor 102. Besides, when the idling switch 99 is turned on, it is determined that the engine output torque is smaller than the predetermined value.

The electronic control unit 90 has a plurality of solenoids 76c, 73a, 72a, 77a and 71a on its output side. The solenoid 76c is selectively turned on or off to switch over the low-high control valve 76 between the low and high modes. The solenoid 73a is used for the downshift relief valve 73 and serves to drain oil from the circuit supplied with a relatively high pressure. This solenoid 73a is a duty solenoid or linear solenoid that is operated during the engine braking or the neutral (N) control. The neutral control will be described later. The solenoid 72a is a duty solenoid or linear solenoid that is used for the ratio control valve 72 and regulates the fluid pressure for speed-change control. The solenoid 77a is a duty solenoid for the low clutch relief valve 77. The solenoid 71a is a linear solenoid used for the primary regulator valve 71 and controls line pressures. The respective solenoids as described above are driven through a solenoid driving circuit 106, which generates a predetermined voltage or output based on signals from an output interface circuit. A monitor circuit 107 monitors the respective solenoids in order to detect any malfunction thereof. Thereby the operations of these solenoids are self-checked.

The electronic control unit 90 further includes on the output side thereof an electronic throttle system section 109 for engine control, a processing circuit 110, a checker member 112, a circuit 113, a display device 115 and a driving circuit for driving the display device 115. The processing circuit 110 outputs signals for driving a stepping motor for the electronic throttle or receives feedback information. The checker member 112 includes an indicator lamp or similar device and outputs the result of self-check when the electronic control unit 90 fails to operate correctly. The circuit 113 outputs the result of the self-check transmitted from the checker member 112. The display device 115 may be an indicator lamp for displaying the state of the infinitely variable transmission, for example, whether it is operated in the power mode or in the economy mode. The infinitely variable transmission 1 has a structure wherein the engine output shaft 2 is connected to the input shaft 3 only through the damper device 12, and does not require the use of the conventionally required starting devices, such as a torque converter, a fluid coupling, an electromagnetic powder clutch, an input clutch, etc. Accordingly, when the vehicle is stopped in the D range or the R range, it is necessary to perform the N-control for automatically establishing the neutral state in the infinitely variable transmission 1.

The N-control is triggered by the neutral control means N, which operates based on a judgment that the aforementioned judgment means requires the neutral state. By this N-control, the axial force applied to the primary pulley 7 becomes substantially equal to that applied to the secondary pulley 9. The N-control is performed at least such that the difference in the axial forces applied to the primary and secondary pulleys 7, 9 becomes smaller than a certain value to such an extent that the relationship in magnitude between the axial forces applied to the primary and secondary pulleys 7, 9 is not reversed. This value is determined by the torque inputted to the CVT and the pulley ratio when the output torque is transmitted in the positive direction or by the torque inputted to the CVT and the pulley ratio when the output torque is transmitted in the negative direction. More specifically, when the first hydraulic chambers 55, 56 of the primary-side and secondary-side hydraulic actuators 7c, 9c are supplied with an equal fluid pressure, the fluid pressures in the second hydraulic chambers 57, 59 are released. As a result, the axial force applied to the primary pulley 7 becomes equal to that applied to the secondary pulley 9.

Here, the N-control is disclosed in detail in Japanese Patent Application Nos. 7-66234 and 7-128701.

According to the disclosure of the above-specified Patent Applications, by repeating such shifts in accordance with the vehicle speed that the CVT is shifted in the U/D (decelerating) direction depending upon the negative torque state at the coasting time and that the CVT is shifted in the O/D (accelerating) direction in the positive torque state when the engine RPM becomes lower than the idle value, the CVT 11 converges by itself to the gear neutral (GN) point in which the vehicle is stably held in the vehicle stopping state. By substantially equalizing the two axial forces of the primary pulley and the secondary pulley (within the predetermined range) on the basis of the axial force difference in the positive and negative torque states, the CVT 11 is stably held at the GN point. However, the self-convergence to the GN point at the N-control time is slowed depending upon the switching of the negative torque and positive torque. In the embodiment of the invention, therefore, the engine torque is controlled in the N-control so as to establish the positive torque at all times.

The principle of self-convergence at the N-control type, as based on the input (engine) torque control is described below. A formula expressing the axial force of a V-belt is exemplified by OGASAWARA's Formula, as expressed by the following Formula 1:

$$FDV = \frac{\phi 1}{\phi 2} \cdot FDN + \frac{\phi 1 \cdot Tin}{2 \cdot r1 \cdot \tan(\theta + p^n)} \cdot \qquad \text{(Formula 1)}$$

$$\left[1 - \frac{1}{2} \cdot \left\{ \frac{\tanh(\lambda \cdot r1 \cdot \phi 1)}{\lambda \cdot r1 \cdot \phi 1} + \frac{\tanh(\lambda \cdot r2 \cdot \phi 2)}{\lambda \cdot r2 \cdot \phi 2} \right\} \right]$$

Here, FDV indicates the axial force of the drive side pulley (or the secondary pulley); FDN the axial force of the driven side pulley (or the primary pulley); f1 the belt contact angle of the drive side pulley; f2 the belt contact angle of the driven pulley; r1 the effective radius of the drive side pulley; r2 the effective radius of the driven side pulley; and Tin the input (engine) torque.

Formula 1 is simplified into Formula 2.

$$FDV = \frac{\phi 1}{\phi 2} \cdot FDN + Tin \cdot f(Ip) \qquad \text{(Formula 2)}$$

Here, f(Ip) indicates a function varying with the pulley ratio (r2/r1).

The drive side axial force FDV to balance the driven side axial force FDN requires the larger force as the input torque Tin becomes higher. Here, the relationship between the axial forces is expressed by Formula 3 if the two axial forces are substantially equalized by the N-control.

$$F_{DV}(\text{at the execution value}) \approx FDN < \frac{\phi 1}{\phi 2} \cdot FDN + Tin \cdot f(Ip) \qquad \text{(Formula 3)}$$

$$= FDV(\text{at the balance value})$$

Here, if the control is made so that the balance value (or theoretical value) in Formula 3 may be FDV~FDN for f1<f2, the axial force of the drive side (or secondary) pulley becomes excessive so that this axial force difference $\Delta F_{DV}$ converges by closing the drive side pulley to bring the CVT into the O/D direction. Specifically, the convergence is made to the GN point for the difference $\Delta F_{DV}$ between the execution value and the balance value (or theoretical value) of the axial force ($\Delta F_{DV}=F_{DV}$(at the execution value)$-F_{DV}$(at the balance value)). This load difference ($\Delta F_{DV}$) becomes larger, as apparent from Formula 3, as the input torque (Tin) becomes higher.

Figure 8:
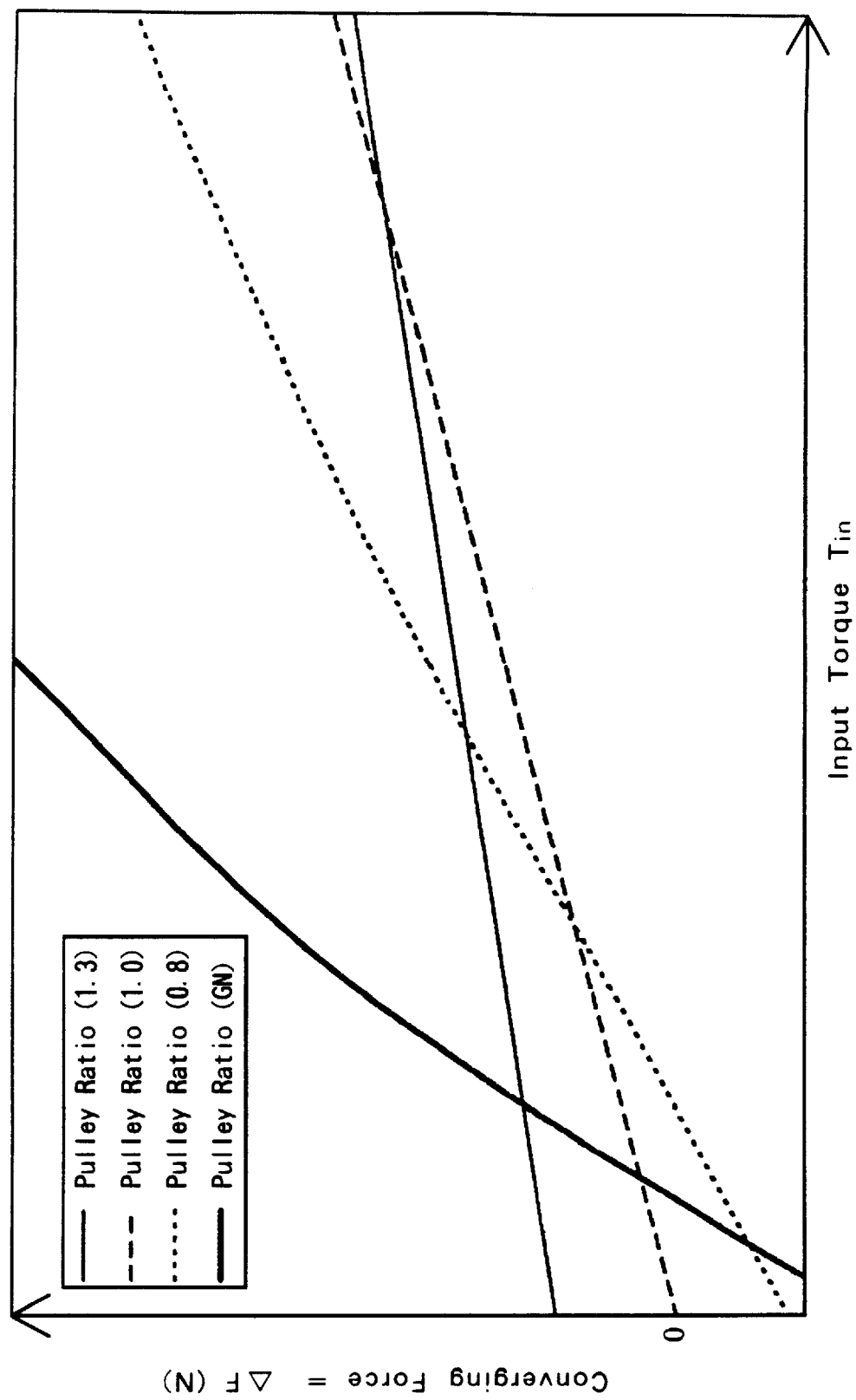
FIG. 8 shows the relationship between the input torque and the converging force at various pulley ratios.

FIG. 8 shows a relationship between the input torque Tin (=TE; engine output torque) and a converging force $\Delta F$ to the GN point based on the formula 1 devised by OGASAWARA. FIG. 8 clearly shows that if the pulley ratio of the CVT assumes respective values (1.3, 1.0, 0.8 and GN), the converging force $\Delta F$ increases in proportion with the increase in the input torque Tin. Furthermore, the increase in the converging force results in an increase in the converging speed.

Figure 9:
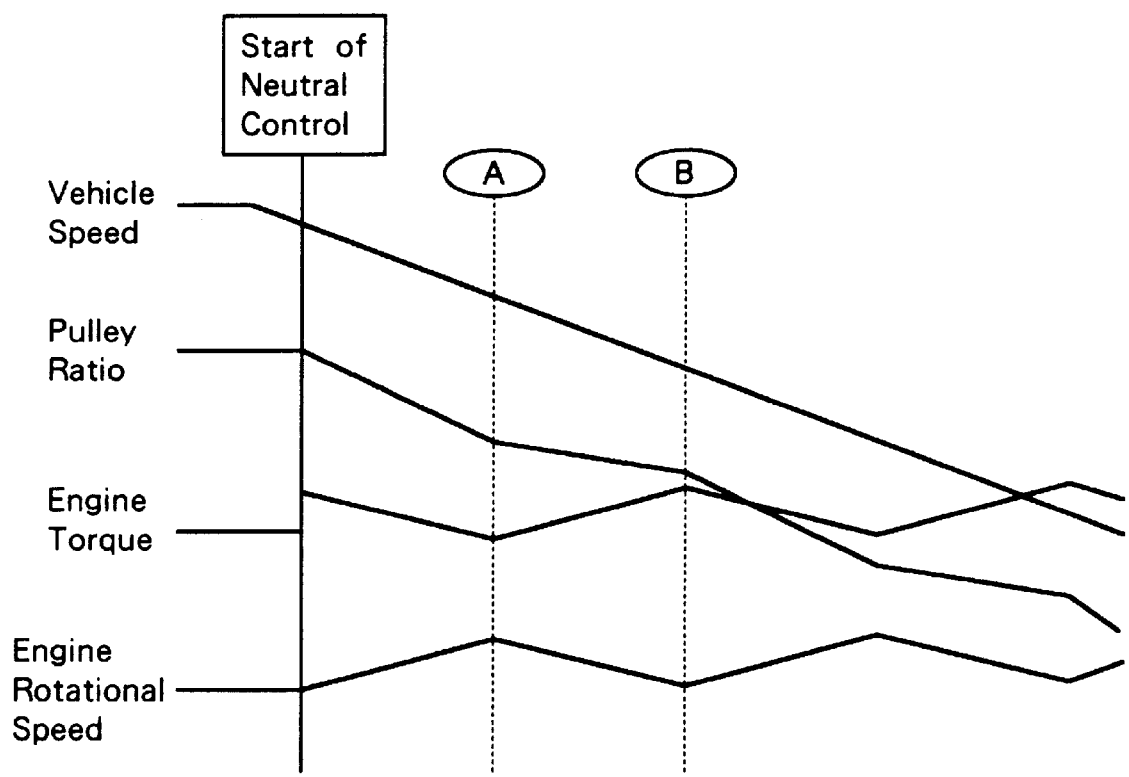
FIG. 9 illustrates a mechanism of convergence to the GN point by the input torque control.

A converging mechanism during the N-control for controlling the input torque, that is, the engine torque (with a constant throttle opening) will be explained with reference to FIG. 9. When the vehicle decelerates with the accelerator pedal being released or the brake pedal being further depressed, if the vehicle speed has dropped below a predetermined value, the N-control is started. The engine output torque (CVT input torque) increases in N-control, so that the pulley ratio of the CVT self-converges to the GN point rapidly. Consequently, the engine rotational speed increases while the engine torque decreases gradually (Start→A).

Then the converging speed decreases due to the decrease in the engine torque, which restricts the increase in the engine rotational speed. The vehicle still continues to decelerate. Therefore the engine rotational speed starts to decrease when the convergence of the CVT can no longer follow the vehicle deceleration (A→B). As the engine rotational speed decreases, the engine torque increases, so that the converging speed sufficiently increases again to be able to follow the vehicle deceleration (after B). Hereinafter this process is repeated. When the pulley ratio of the CVT has finally converged to the GN point, the vehicle is stopped.

Figure 10:
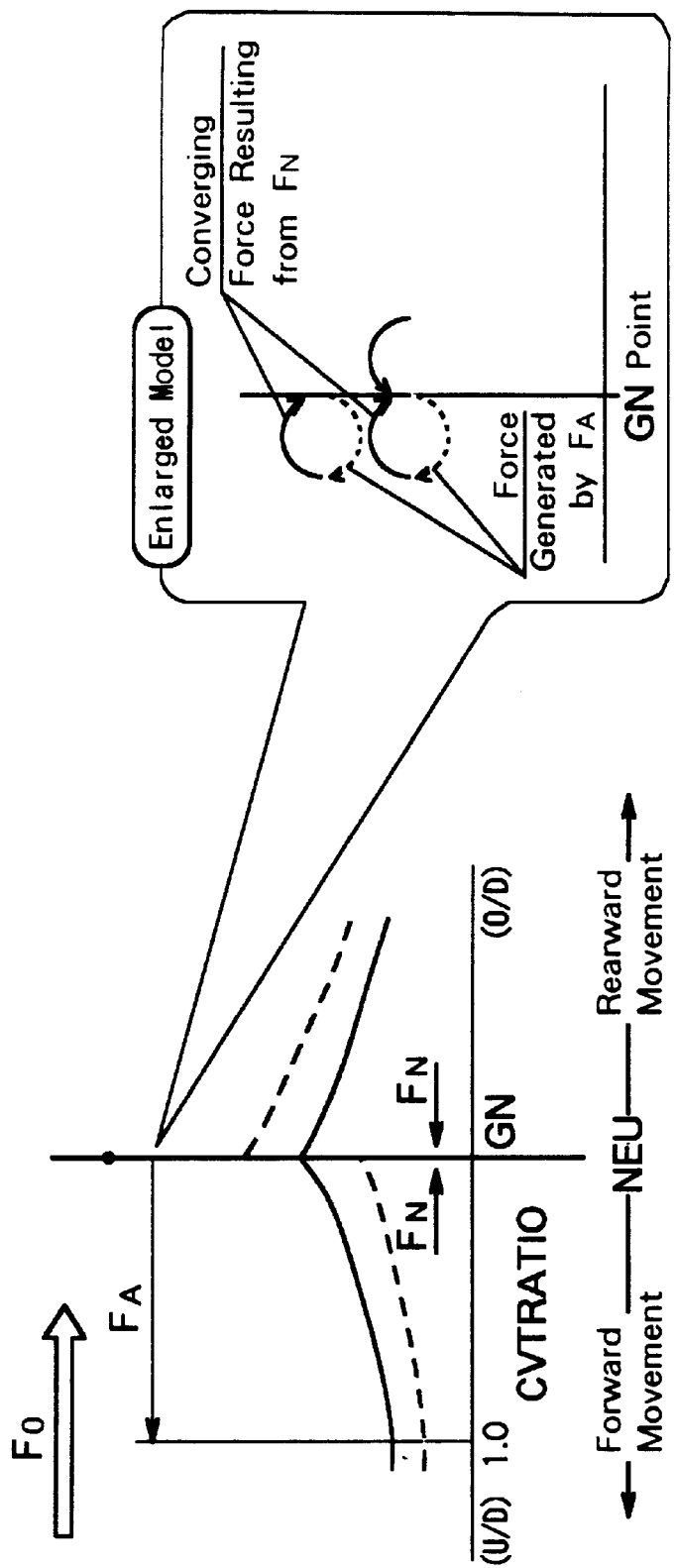
FIG. 10 illustrates a mechanism of generating creep torque.

The principle of generating creep torque in the infinitely variable transmission (IVT) 1 where the neutral state is achieved upon convergence of the CVT to the GN point, will now be described with reference to FIG. 10. A conventional automatic transmission (A/T) having a multi-stage transmission mechanism such as a planetary gear set is provided with a torque converter (starting device) between the input shaft thereof and the engine output shaft. When the input shaft of the multi-stage transmission mechanism is stopped, this torque converter transmits the torque (stall torque) which is increased in accordance with the engine rotational speed to the input shaft, thereby starting the vehicle smoothly. The infinitely variable transmission 1 is automatically maintained in the neutral position by the N-control. In this neutral state, the transmission 1 generates torque (creep torque) in the forward direction, as is the case with the torque converter as described above.

As described previously, when the CVT self-converges to the GN point from the forward-moving range or the rearward-moving range, a self-converging force $F_N$ is generated. Upon convergence to the GN point, the load applied to the CVT becomes zero or infinitely close to zero. On the other hand, the CVT 11 itself is in a stable state when the primary and secondary pulleys are balanced due to the belt tensioning forces, that is, when the pulley ratio is 1.0. In order for the pulley ratio to reach 1.0, a force $F_A$ is generated. Accordingly, the infinitely variable transmission (IVT) 1 becomes unloaded upon convergence of the CVT to the GN point, while the force FA is generated in such a direction that the pulley ratio becomes 1.0, to which the CVT itself stably converges. Namely, the force FA approaches a point where the pulley ratio is 1.0 in the unloaded state, while the force $F_N$ approaches the GN point in the loaded state which occurs when the CVT deviates from the GN point because of the force FA. As illustrated in the enlarged model diagram of FIG. 10, these forces $F_A$, $F_N$ generate a force in a circular direction, thus generating creep torque in the forward direction.

If the axial force F0 in the O/D direction is applied to the CVT in opposition to the force FA which approaches the point where the pulley ratio is 1.0, this force FA is nullified and the creep torque in the forward direction is thus eliminated. In this case, the application of the force F0 is effected, for example, by providing a certain difference in the areas of the primary-side and secondary-side first hydraulic chambers 55, 56. The axial forces FA, F0 are not influenced by the input torque or transmission efficiency. By biasing the axial forces applied to the primary and secondary pulleys during the N-control from substantially the same value as described above by a predetermined amount, it is possible to obtain an arbitrary creep torque.

Figure 11:
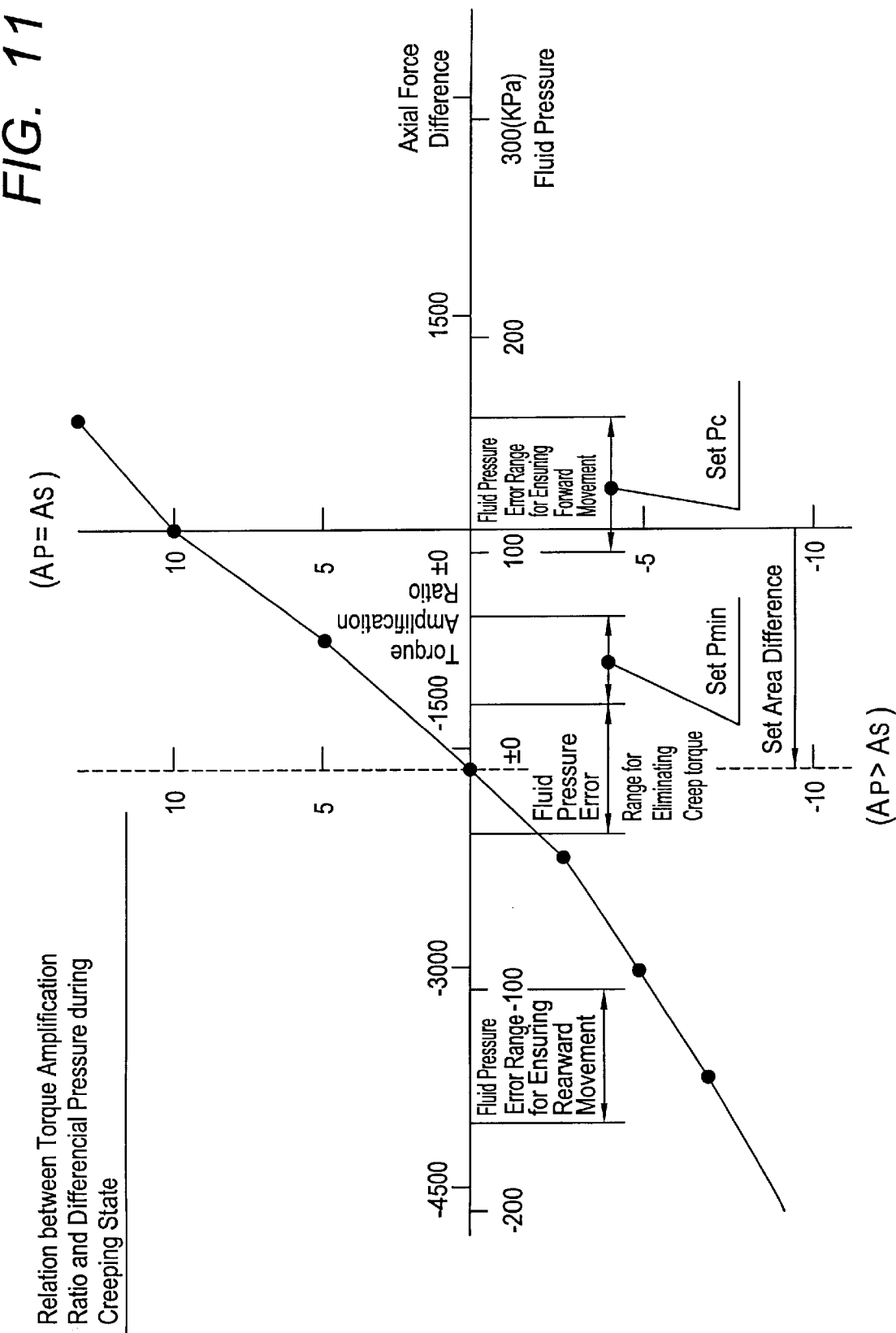
FIG. 11 shows the relationship among the torque amplification ratio, the difference in the axial forces applied to both the pulleys and the difference in the fluid pressures during the creeping state.

FIG. 11 illustrates a relationship between the difference in the axial forces applied to the primary and secondary pulleys (upper part), the difference in the fluid pressures supplied (lower part) and the creep torque. The difference in the axial forces applied to the primary and secondary pulleys is represented above the abscissa axis. The torque amplification ratio in the forward direction is represented by the upper part of the ordinate axis, and the torque amplification ratio in the rearward direction is represented by the lower part thereof. As shown in FIG. 1, if the first hydraulic chambers 55, 56 of the primary and secondary pulleys 7, 9 have an equal effective pressurized area (Ap=As), the difference in the axial forces applied to both the pulleys becomes zero. Therefore the creep torque is generated in the forward direction with a predetermined torque amplification ratio. The difference in the fluid pressures supplied to the primary-side and secondary-side hydraulic actuators is represented below the abscissa axis. In this case, the infinitely variable transmission is set such that the creep torque becomes approximately zero when the primary-side and secondary-side hydraulic actuators, having different effective pressurized areas (Ap>As), are supplied with an equal fluid pressure. In this case, if a creep torque in the forward direction that is approximate to that obtained from the conventional torque converter is set while ensuring that the infinitely variable transmission 1 is in the forward-moving state, the fluid pressure supplied to the secondary-side hydraulic chamber is higher than that supplied to the primary-side hydraulic chamber. That is, a positive differential pressure PC is supplied to the secondary-side hydraulic chamber. As long as the fluid pressure is within a range ensuring forward-movement, a predetermined creep torque in the forward direction is generated even during the N-control. The vehicle starts to creep forward upon release of the brake pedal.

By providing a certain difference in the areas of the hydraulic chambers of both the pulleys and setting the force FA equal to the force F0, the creep torque becomes zero. When actually performing the control, however, there is a certain error range in the set fluid pressure. When the fluid pressure is within this error range, a torque may be generated in the rearward direction even if the driver intends to move forward. It is therefore desirable to set a range Pmin on the forward-moving side in the range where the vehicle does not move forward in the actual situation, by supplying a very small differential pressure (a torque smaller than that required for the vehicle movement) to the secondary-side hydraulic chamber. When the difference in the supplied fluid pressures is within this range Pmin during the N-control, the vehicle keeps moving even if the brake pedal is released.

Furthermore, if the fluid pressure supplied to the primary-side hydraulic chamber is higher than that supplied to the secondary-side hydraulic chamber, the difference in the fluid pressures enters the error range where the rearward-moving state of the infinitely variable transmission is ensured. In this case, creep torque is generated in the rearward direction even during the N-control. Accordingly, when the brake pedal is released, the vehicle starts to creep rearward.

Figure 12:
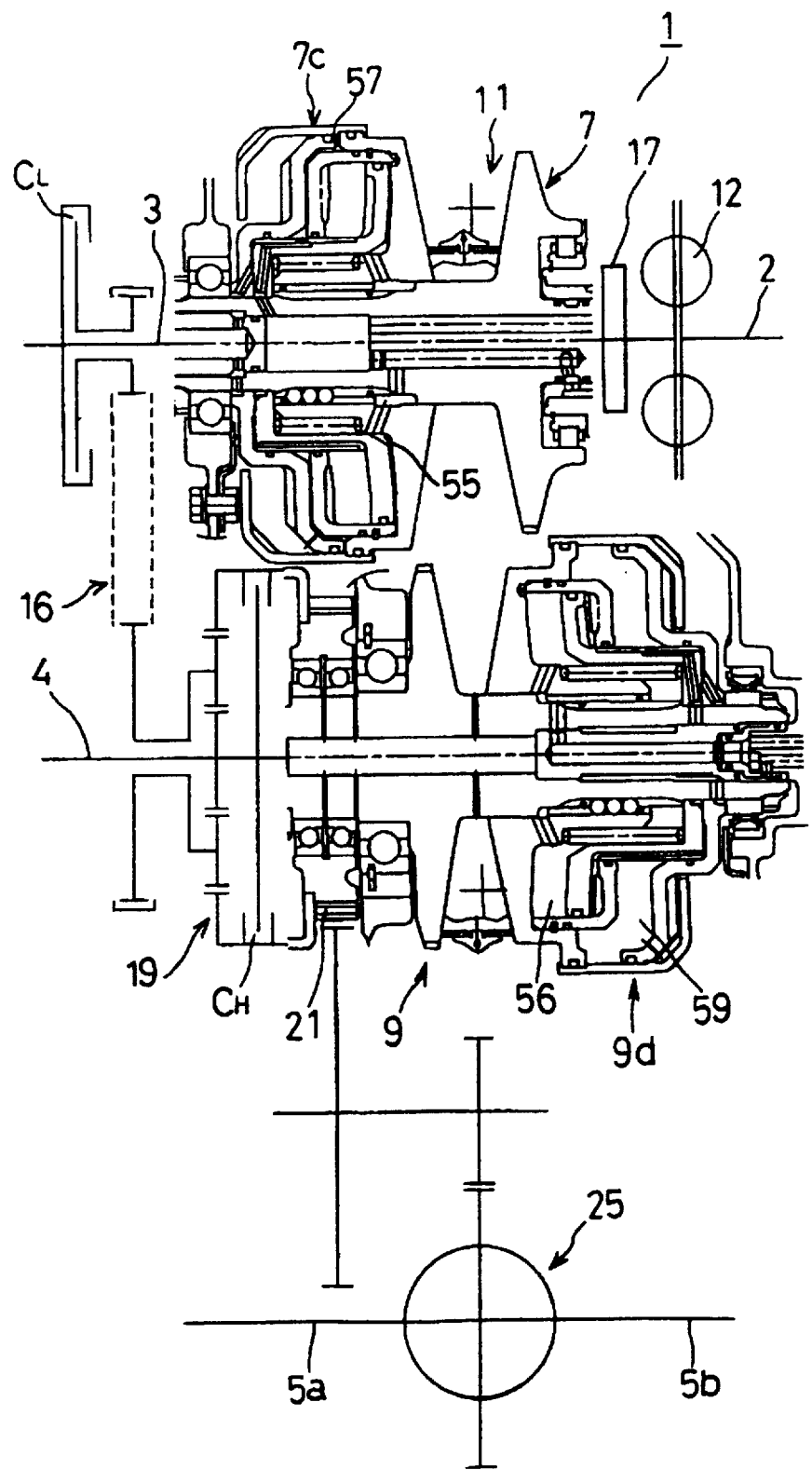
FIG. 12 is a front sectional view of an infinitely variable transmission with a different effective pressurized area.

In another embodiment of the invention, when the first hydraulic chambers of both the primary and secondary pulleys are supplied with an equal pressure, the creep torque becomes approximately zero. This embodiment will now be described with reference to FIG. 12. Although the primary-side hydraulic actuator 7c illustrated in FIG. 12 is identical to that illustrated in FIG. 1, the secondary-side hydraulic actuator 9d is slightly different. Although the effective pressurized area of the second hydraulic chamber 59 of the secondary-side hydraulic actuator 9d is equal to that of the primary-side second hydraulic chamber 57, the effective pressurized area (As) of the first hydraulic chamber 56 is set to be less than that (Ap) of the primary-side first hydraulic chamber 55 by a predetermined value (Ap>As). Accordingly, the axial force Fs applied to the secondary pulley 9 becomes smaller than that Fp applied to the primary pulley 7 by a predetermined value during the N-control where the fluid pressures in the primary-side and secondary-side second hydraulic chambers 57, 59 are released and the first hydraulic chambers 55, 56 are supplied with an equal predetermined fluid pressure. The difference in the axial forces (Fp−Fs) applied to both the pulleys becomes equal to the force $F_0$. This force $F_0$ opposes the force $F_A$ that approaches the point where the pulley ratio is 1.0, so that the creep torque in the forward direction is eliminated. In this state, the creep torque becomes approximately zero during the N-control, and the vehicle remains stopped even if the brake pedal is released.

Furthermore, a partially modified infinitely variable transmission and hydraulic control mechanism will be described with reference to FIGS. 13, 14. Since this infinitely variable transmission 1 is identical to those of the above embodiments except for the hydraulic actuators, like components are denoted by like reference numerals and symbols and will not be described in any further detail.

Flange members 120, 121 are fixed to the ends of the boss portions of the stationary sheaves 7a, 9a of the primary and secondary pulleys 7, 9 respectively. Drum members 122, 123 are fixed to the back surfaces of the movable sheaves 7b, 9b respectively. Hydraulic chambers 125, 126 are formed between the back surfaces of the movable sheaves 7b, 9b and the flange members 120, 121 respectively. Hydraulic actuators 7e, 9e of a single chamber type are thus formed on the primary and secondary sides respectively. The hydraulic chambers 125, 126 are supplied with a fluid pressure through hydraulic paths 127, 129 respectively. In the hydraulic chambers 125, 126, there are disposed respectively pre-loading springs 130, 131 in a compressed state.

In the primary-side and secondary-side hydraulic actuators 7e, 9e, the effective pressurized area Ap of the primary-side hydraulic chamber 125 is greater than that As of the secondary-side hydraulic chamber 126 by a predetermined value (Ap>As). When both the hydraulic chambers 125, 126 are supplied with an equal fluid pressure, the creep torque becomes approximately zero.

Figure 14:
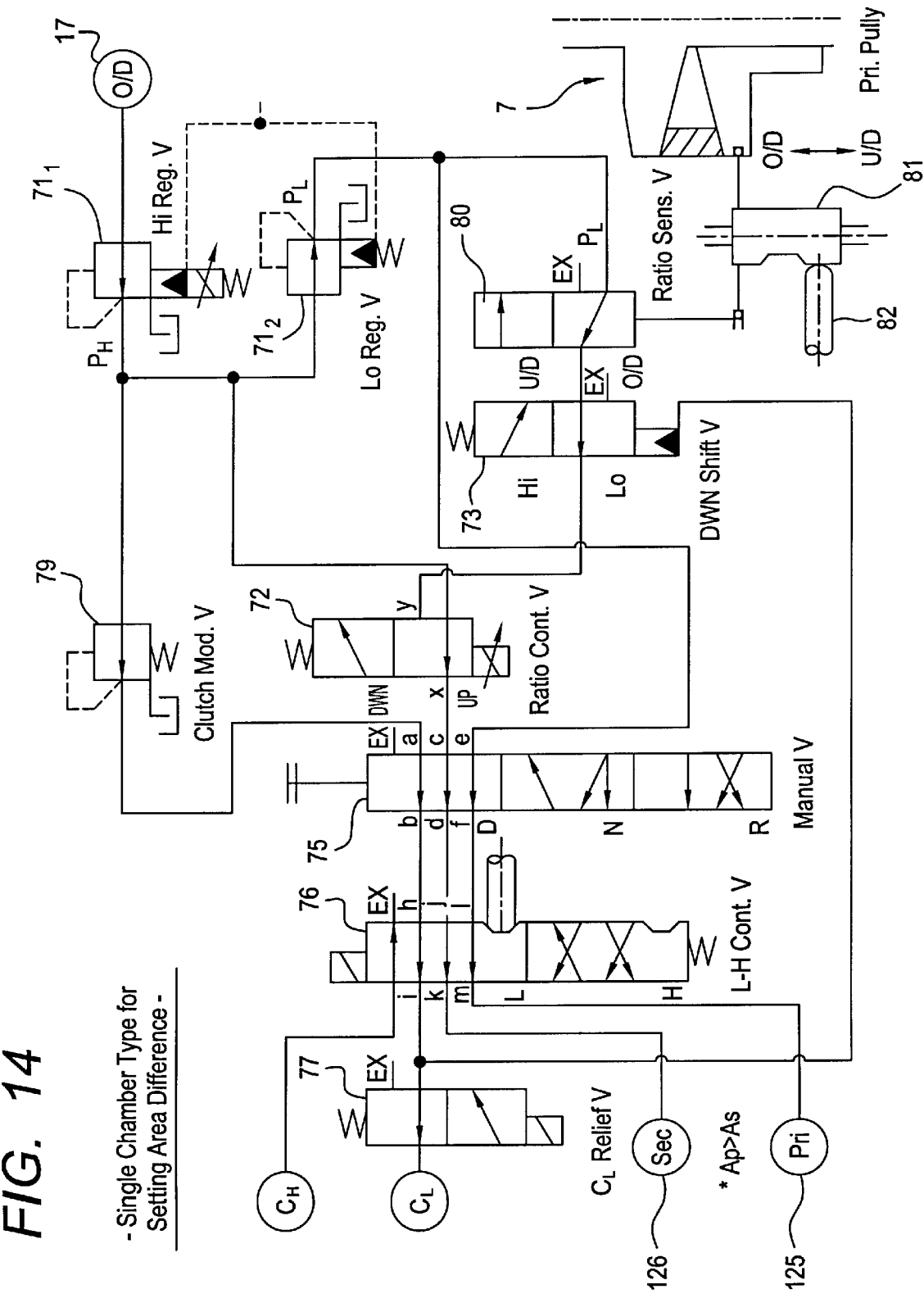
FIG. 14 shows a hydraulic control mechanism of the infinitely variable transmission according to another embodiment of the invention.

FIG. 14 shows a hydraulic control mechanism that can be applied to the hydraulic actuators 7e, 9e, each of which include a single chamber. This hydraulic control mechanism is different from that illustrated in FIG. 6 in that it has two regulator valves. Namely, this hydraulic control mechanism is provided with a high regulator valve 711 and a low regulator valve 712.

In the low mode of the D range, the fluid pressure adjusted by the high regulator valve 711 is supplied to the hydraulic servo for the low clutch CL through the clutch modulation valve 79, ports a, b of the manual valve 75, ports h, i of the low-high control valve 76 and the low clutch relief valve 77. The fluid pressure is also adjusted by the ratio control valve 72 and supplied to the secondary-side hydraulic chamber 126 through ports c, d of the manual valve 75 and ports j, k of the low-high control valve 76. On the other hand, the fluid pressure from the low regulator valve 712 is supplied to the primary-side hydraulic chamber 125 through ports e, f of the manual valve 75 and ports l, m of the low-high control valve 76.

Accordingly, while a constant low pressure based on the low regulator valve 712 is supplied to the primary-side hydraulic chamber 125, a high pressure based on the high regulator valve 711 is supplied to the secondary-side hydraulic chamber 126. This high pressure supplied to the secondary-side hydraulic chamber 126 is suitably adjusted by the ratio control valve 72 to achieve the speed-change operation of the CVT 11.

During the N-control, the ratio control valve 72 is switched over to the down-side, so that the constant low pressure from the low regulator valve 712 is supplied to the secondary-side hydraulic servo 126 through the ratio sensing valve 80, the downshift relief valve 73, ports x, y of the ratio control valve 72, ports c, d of the manual valve 75 and ports j, k of the low-high control valve 76.

The primary-side and secondary-side hydraulic chambers 125, 126 are thus supplied with equal fluid pressure from the low regulator valve 712. Because of the difference in the areas of both the hydraulic chambers (Ap>As), the creep torque becomes approximately zero.

In the high mode of the D range, the low-high control valve 76 is switched over, so that the fluid pressure from the clutch modulation valve 79 is supplied to the hydraulic servo for the high clutch CH. Furthermore, the constant low pressure from the low regulator valve 712 is supplied to the secondary-side hydraulic chamber 126, while the high pressure from the high regulator valve 711 is supplied to the primary-side hydraulic chamber 125. The ratio control valve 72 suitably adjusts this high pressure.

Figure 13:
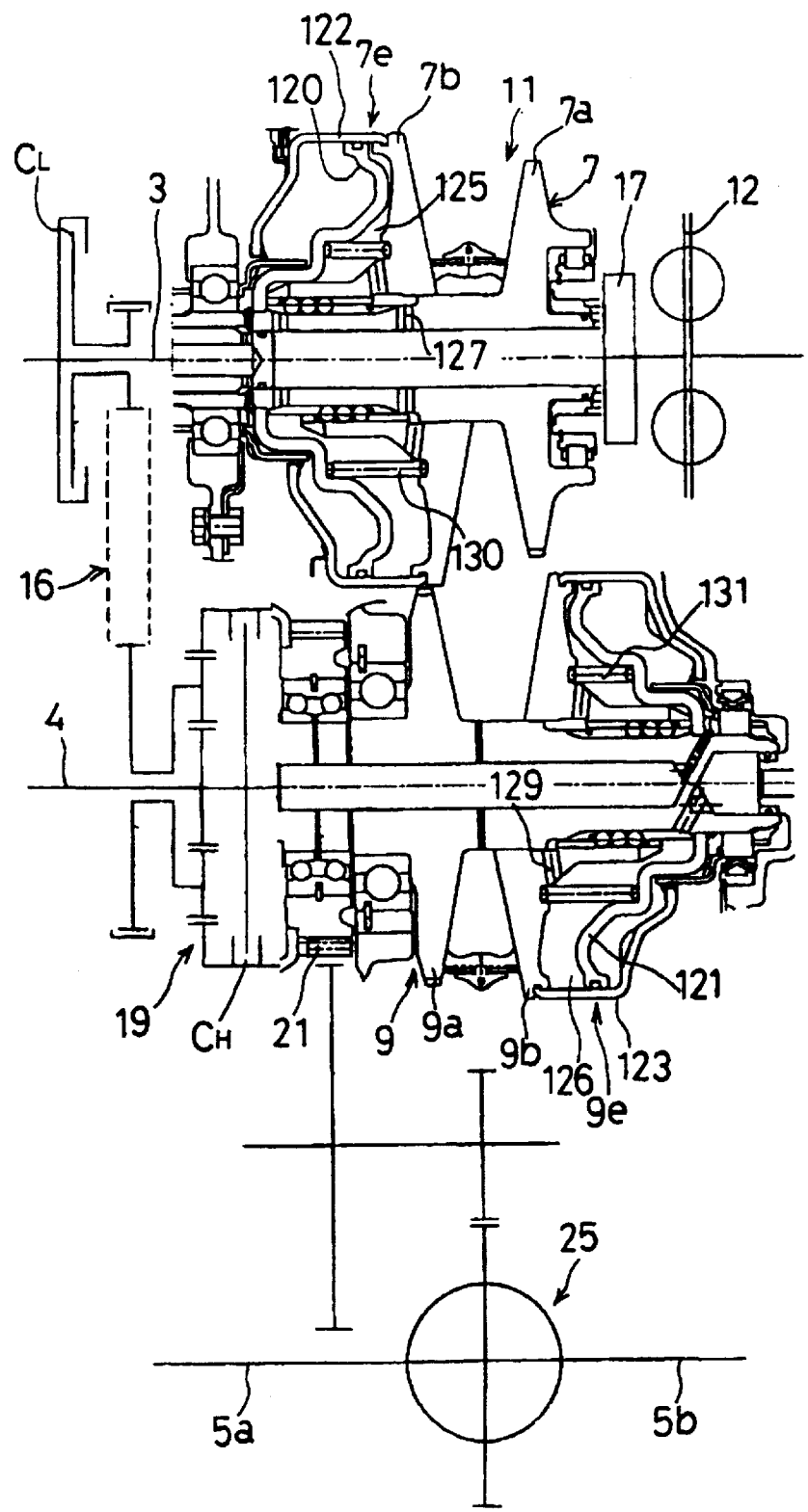
FIG. 13 is a front sectional view of another infinitely variable transmission according to another embodiment of the invention.

According to the hydraulic actuators illustrated in FIG. 13, as those illustrated in FIG. 12, there is a difference in the areas of both the hydraulic chambers so that the creep torque becomes approximately zero. However, as those illustrated in FIG. 1, it is of course possible to supply an equal fluid pressure to the hydraulic actuators to generate creep torque in the forward direction.

Figure 15:
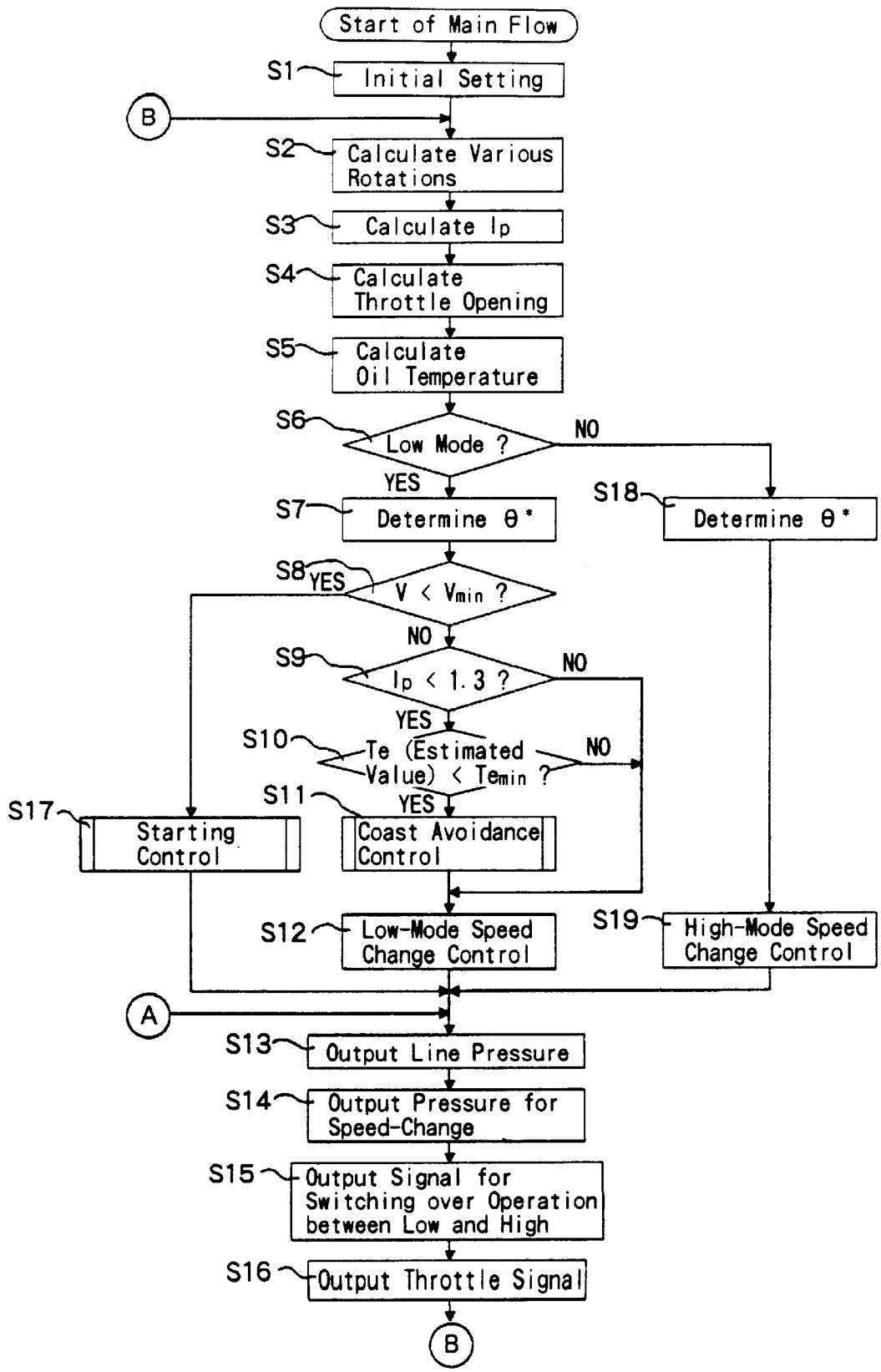
FIG. 15 is a main flowchart illustrating the control of the infinitely variable transmission.

The control according to this embodiment will be described with reference to a main flowchart of FIG. 15.

In step S1, all of the conditions are reset following the start of the program. In step S2, the current rotations of the T/M input shaft (primary shaft), the secondary shaft and the output shaft are calculated based on signals from the T/M input (primary shaft) rotation sensor 91, the secondary shaft rotation sensor 92 and the vehicle speed sensor 93. In step S3, the pulley ratio Ip (the rotation of the primary shaft/the rotation of the secondary shaft) is calculated from the rotations of the input shaft and the secondary shaft. In step S4, the current throttle pedal opening (d) set by the driver is calculated based on signals from the sensor 96 for detecting the throttle pedal opening set by the driver. In step S5, the current transmission oil temperature (ATF oil temperature) is calculated based on signals from the T/M temperature sensor 101. In step S6, it is determined whether or not the current state of the infinitely variable transmission is the low mode, based on signals of the solenoid 76c for switching over the operation between the low and high modes. In step S7, a target throttle opening (θ*) in the low mode is calculated. In step S8, it is determined whether or not the vehicle is stopped, by comparing the current vehicle speed V obtained from the vehicle speed sensor 93 with a predetermined minimum vehicle speed Vmin.

In step S9, it is determined whether or not the current pulley ratio is smaller than the pulley ratio B as shown in FIG. 4 (1.3, for example), which may hinder smooth torque transmission based on the transmission efficiency and generate a great engine braking effect (failure in power transmission resulting from the coasting state) based on a large gear ratio in the coasting state. In step S10, it is determined whether or not an estimated torque value Te, which is obtained from a map based on signals from the engine throttle opening sensor 97 and the engine rotational speed sensor 102, is smaller than a set value Temin. Step S11 is a subroutine for coast avoidance control, which prevents the engine from being driven negatively (switched over to the coasting state). The coast avoidance control will be described later.

In step 12, the speed-change control in the low mode as described above is performed. It is to be noted herein that, when a forcible off-up flag defined by step 11-4 is turned on, the speed-change rate is determined to have reached its maximum. Then the upshift operation is performed. The forcible off-up flag will be described later. In step S13, the line pressure calculated by outputting pressure signals to the solenoid 71a for hydraulic control is controlled using the linear solenoid pressure. In step S14, the fluid pressure required for the speed-change operation is controlled using the solenoid pressure, by outputting signals to the solenoid 77 a for ratio control. In step S15, the switching-over of the clutch between the low and high modes is controlled using the solenoids. In step S16, a target throttle opening signal is outputted by sending signals to the electronic throttle system 109.

Step S17 is a subroutine for starting control when starting from a stopped state, which will also be described later. In step S18, a target throttle opening θ* in the high mode is calculated. In step S19, the speed-change control in the high mode is performed.

Figure 16:
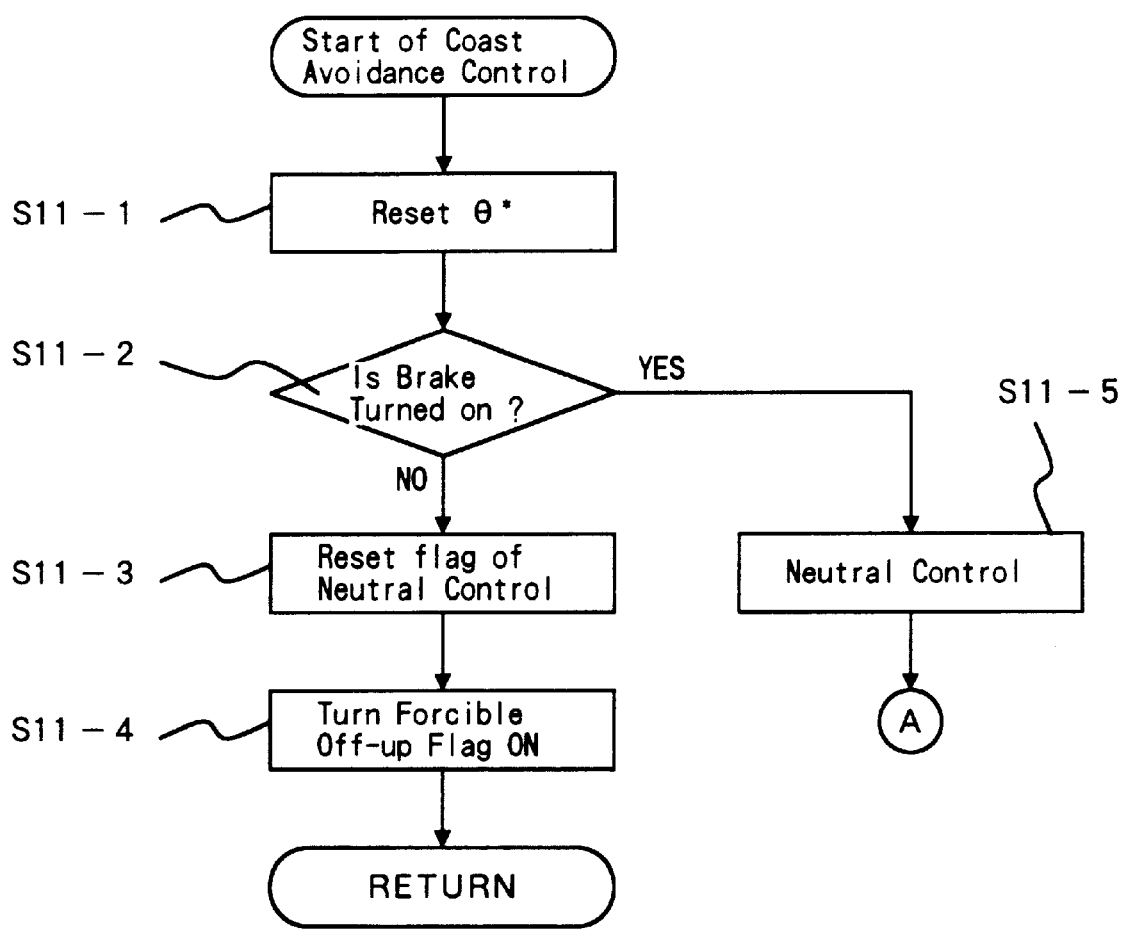
FIG. 16 is a flowchart showing a subroutine for the coast avoidance control of the infinitely variable transmission.
Figure 17:
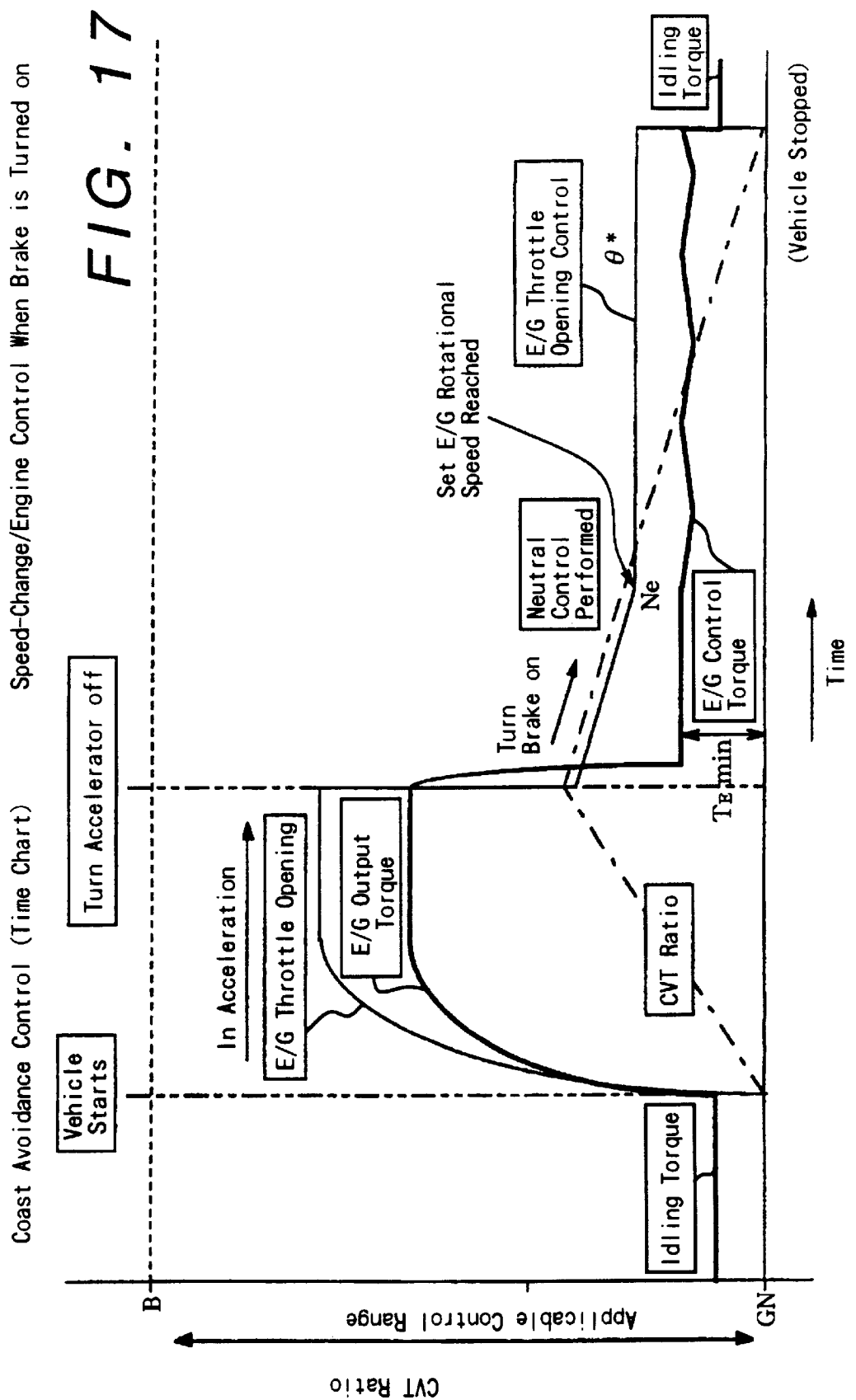
Figure 19:
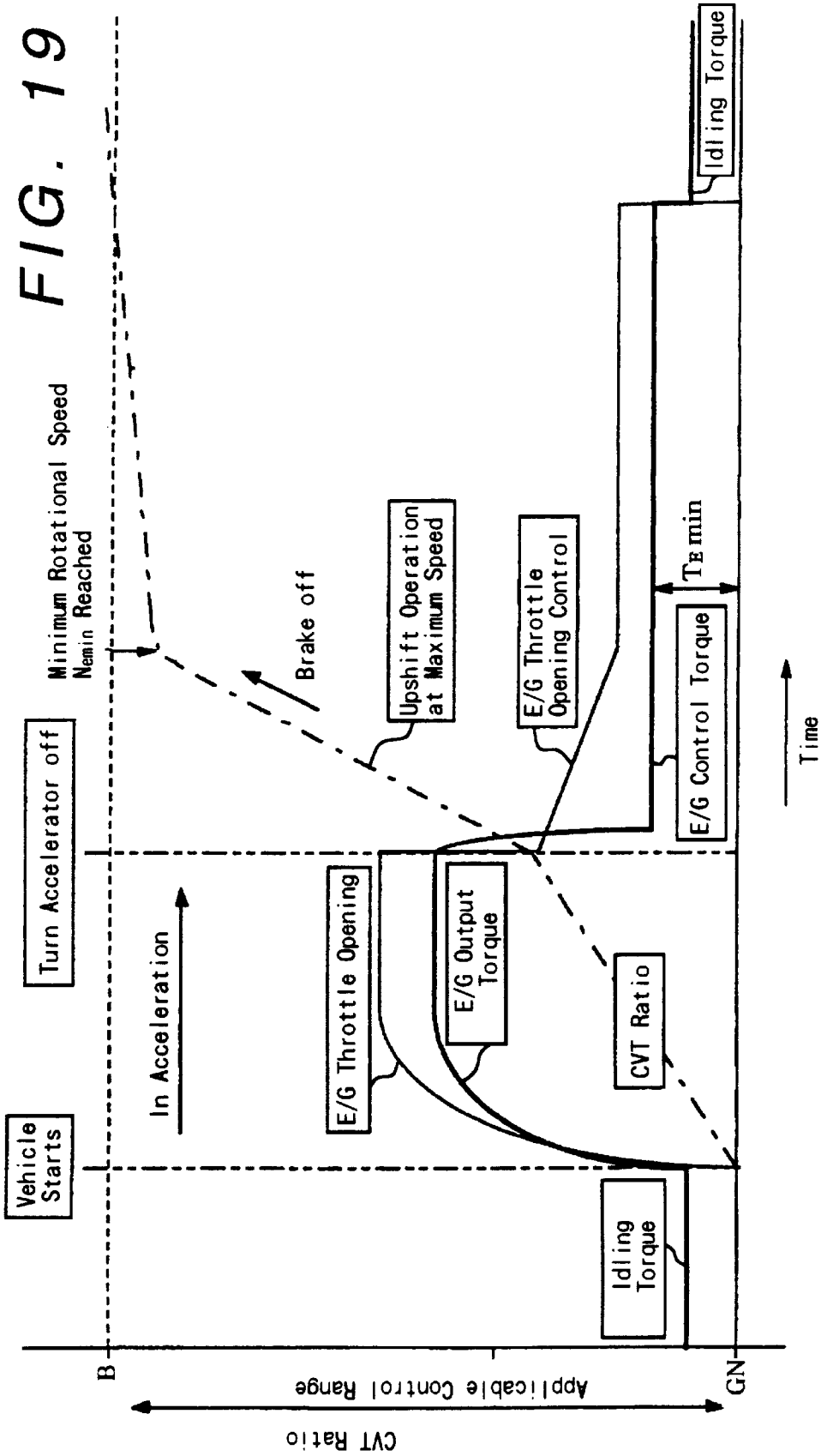
FIG. 19 is another time chart for the coast avoidance control when the brake pedal is turned off.
Figure 20:
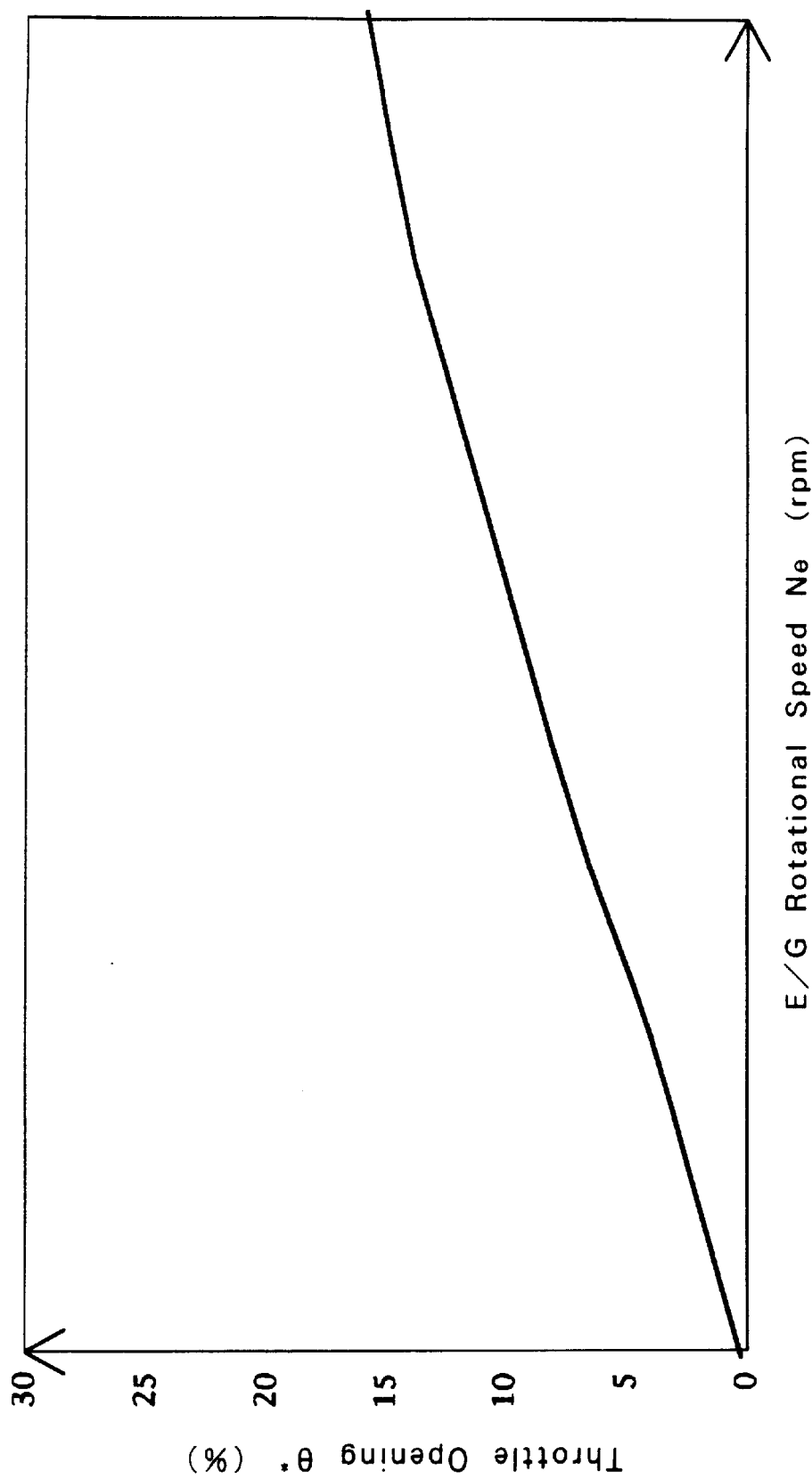
FIG. 20 is a chart showing the target throttle opening set by the electronic throttle system with respect to the engine rotational speed.

The coast avoidance control, which characterizes the invention, will now be described with reference to a flow chart of FIG. 16 and time charts of FIGS. 17 through 19. The coast avoidance control is performed if vehicle speed V is greater than the minimum vehicle speed Vmin, the pulley ratio Ip is within a predetermined range that may cause failure in transmission due to the coasting state (Ip<B), and the engine torque Te is smaller than a predetermined minimum engine torque Temin with the accelerator pedal being released. First, a target throttle opening θ* set by the electronic throttle system 109 is calculated from the current engine rotational speed using a map illustrated in FIG. 20, so that the target throttle opening as set in step S7 is reset (S11-1). The brake switch 98 then determines whether the brake pedal is depressed.

If the brake is turned on, the N-control is performed (S11-5). FIG. 17 is a time chart for the speed-change control and the engine control when the brake is turned on. First, when the vehicle is stopped, with the CVT 11 located at the GN point (0.692, for example) and the engine in the idling state, the starting control is performed upon depression of a throttle pedal. Then the engine throttle opening is controlled by the electronic throttle system 109 to increase the engine output torque. The creep torque in the forward direction is thus generated. As a result, the vehicle starts to move forward and the CVT 11 is shifted in the U/D direction and accelerated. When the pulley ratio is within a predetermined range (Ip<B), the neutral (N) control is triggered upon release of the accelerator pedal as well as depression of the brake pedal.

During the N-control, the fluid pressure supplied to the secondary-side second hydraulic chamber 59 illustrated in FIGS. 1 and 12 is released, the low pressure from the low regulator valve 712 is supplied to the secondary-side hydraulic chamber 126, and both the pulleys 7, 9 are supplied with an equal fluid pressure. Simultaneously, the throttle opening θ* is controlled by the electronic throttle system, and the engine outputs a predetermined low torque TEmin, which is inputted to the CVT 11. This causes the CVT 11 to converge to the GN point relatively rapidly, as described previously.

In this case, the input rotation sensor 91 detects the rotation of the input shaft. The throttle opening θ* is controlled by the electronic control system based on the chart shown in FIG. 20. Namely, the control is performed to output a predetermined engine torque such that the coasting state where torque is transmitted from the wheels to the engine is avoided, and that the converging force during the N-control does not assume a negative value.

As the CVT 11 is shifted in the O/D (downshift) direction in proportion with the vehicle deceleration, the throttle opening θ* also decreases gradually. When the engine rotational speed reaches a set value Ne for outputting the constant low torque TEmin, the throttle opening θ* is fixed to a value that allows the set engine rotational speed Ne and the predetermined torque TEmin to be reached (θ* is constant). With the predetermined torque TEmin being fixed, the CVT 11 automatically converges to the GN point. When the CVT 11 reaches the GN point, the vehicle is stopped.

When the brake pedal is turned off, an N-control flag that has been set during the N-control (S11-5) is reset (S11-3) and the forcible off-up flag is turned on (S11-4). This state will be explained referring to the time charts of FIGS. 18 and 19. Since the starting control prior to release of the accelerator pedal is identical to that illustrated in FIG. 17, the explanation thereof is omitted here.

Figure 18:
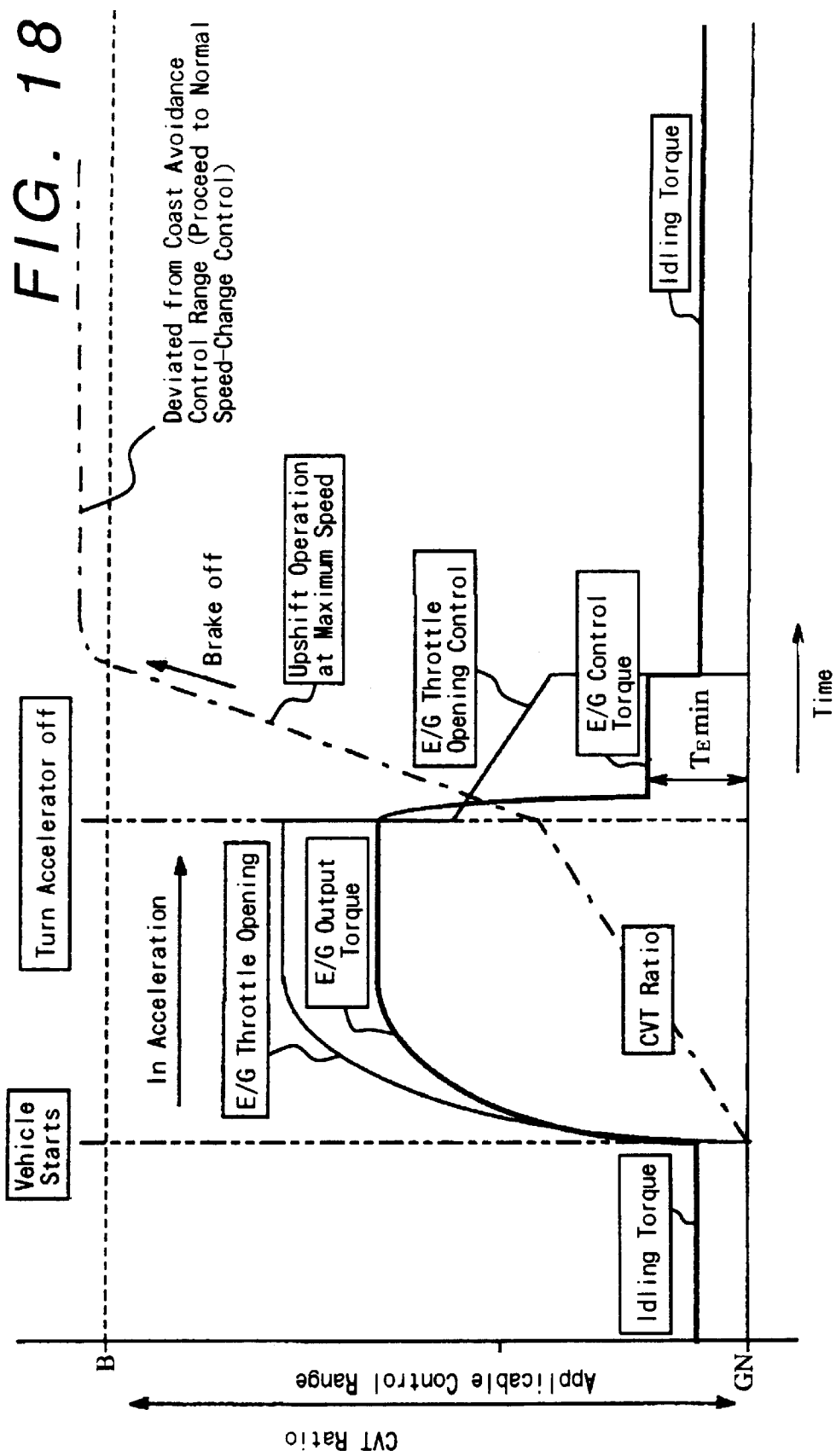
FIG. 18 is a time chart for the coast avoidance control when the brake pedal is turned off.

As shown in FIG. 18, when the accelerator pedal is turned off, a signal is outputted to the solenoid 72a for ratio control. The ratio solenoid valve 72 thus outputs a maximum fluid pressure, which is supplied to the secondary-side second hydraulic chamber 59 (FIGS. 1 and 12) or to the secondary-side hydraulic chamber 126 (FIG. 13). Thereby the CVT 11 is shifted in the U/D (upshift) direction at a maximum speed and escapes from the range defined by the predetermined pulley ratio B rapidly, which range may hinder smooth torque transmission based on the transmission efficiency and generate a great engine braking effect (failure in power transmission resulting from the coasting state) based on a large gear ratio.

In this case, the throttle opening θ* is controlled by the electronic control system such that the engine outputs the constant torque TEmin. In this state, the vehicle keeps moving by inertia with both the accelerator pedal and the brake pedal being released. The rotation of the input shaft 3 drops rapidly due to the upshift operation of the CVT 11, and the throttle opening θ* decreases correspondingly. When the pulley ratio of the CVT 11 exceeds the predetermined pulley ratio B that may cause failure in transmission due to the coasting state, the coast avoidance control is stopped. Instead, the forward speed-change control is started (S12), while the throttle opening becomes corresponding to the idling state.

During the coast avoidance control where the brake pedal is released, the rotation of the input shaft 3 decreases due to the upshift operation of the CVT 11 at a maximum speed. In response to this decrease in the input shaft rotation, the engine rotational speed reaches its minimum Nemin (600 rpm, for example), which is a threshold value for engine stall. Then the throttle opening is controlled and adjusted to a constant value, so that the engine outputs the constant low torque TEmin and the engine rotational speed remains at the minimum value Nemin. Simultaneously, due to the low mode speed-change control, the CVT 11 is gradually shifted in the upshift direction to an extent corresponding to the vehicle deceleration resulting from the inertial running state thereof. When the pulley ratio of the CVT exceeds the pulley ratio B that may cause failure in transmission resulting from the coasting state, the throttle opening assumes a value corresponding to the idling state.

The coast avoidance control has been described above relative to the case where the vehicle moves forward in the D range. However, even if the vehicle moves rearward in the R range, a predetermined value exists, which is shifted an amount from the GN point of the CVT 11 in the O/D direction, that may hinder smooth torque transmission based on the transmission efficiency and bring about great engine braking effect (failure in power transmission resulting from the coasting state) based on a large gear ratio. With the pulley ratio being smaller than the predetermined value, when the accelerator pedal is not operated or the engine output torque is smaller than the predetermined value TEmin, the coast avoidance control is likewise performed.

Figure 21:
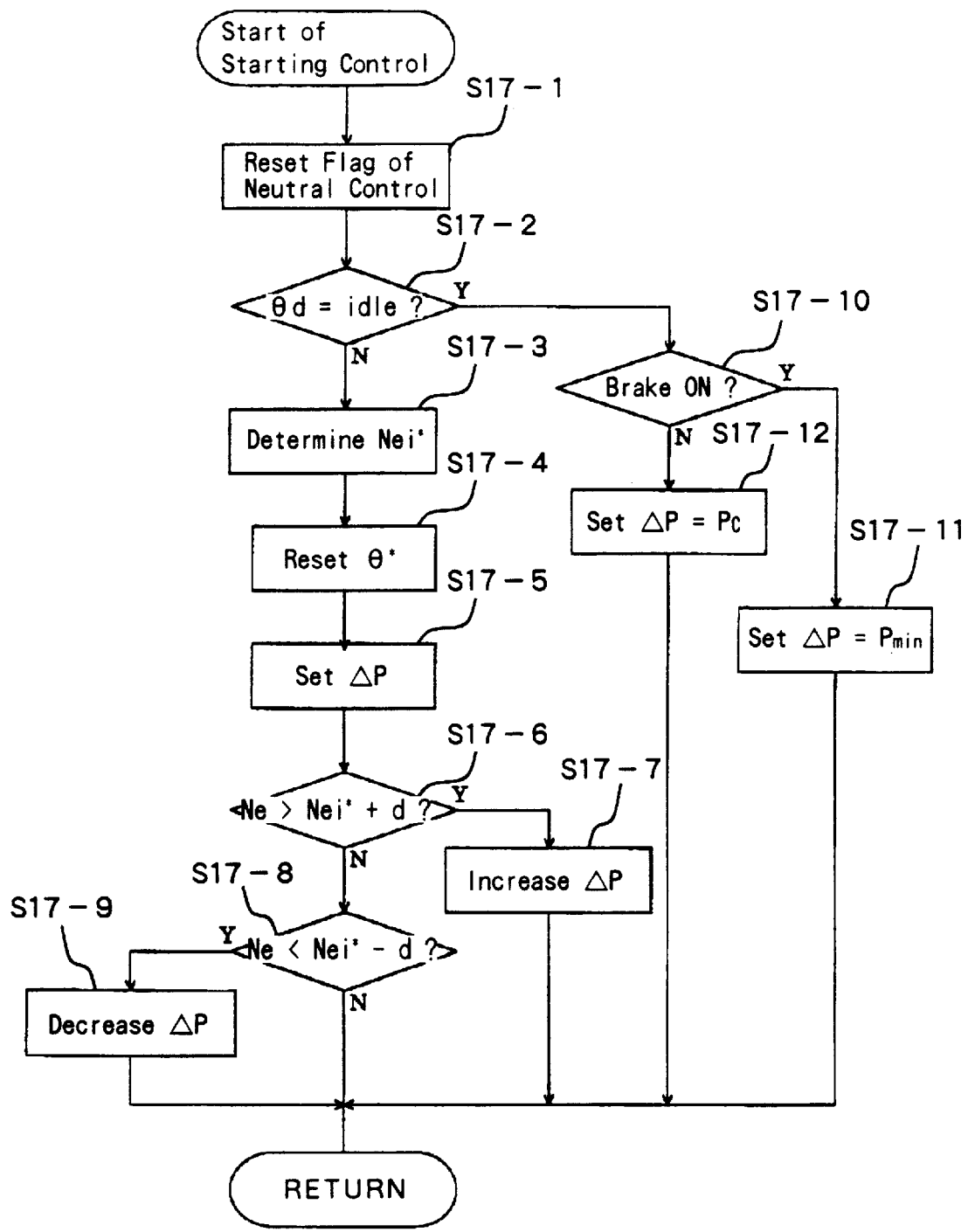
FIG. 21 is a flowchart showing a subroutine for the starting control.

The starting control in step S17 (FIG. 15) will now be described with reference to a flowchart of FIG. 21 and a time chart of FIG. 22. First, since the vehicle speed drops below the set minimum value Vmin, the N-control flag is reset (S17-1). The idling switch 99 then determines whether the throttle opening is a value corresponding to the idling state. If yes, the neutral (N) control is performed. The brake pedal switch 98 further determines whether the brake is turned on (S17-10).

Figure 22:
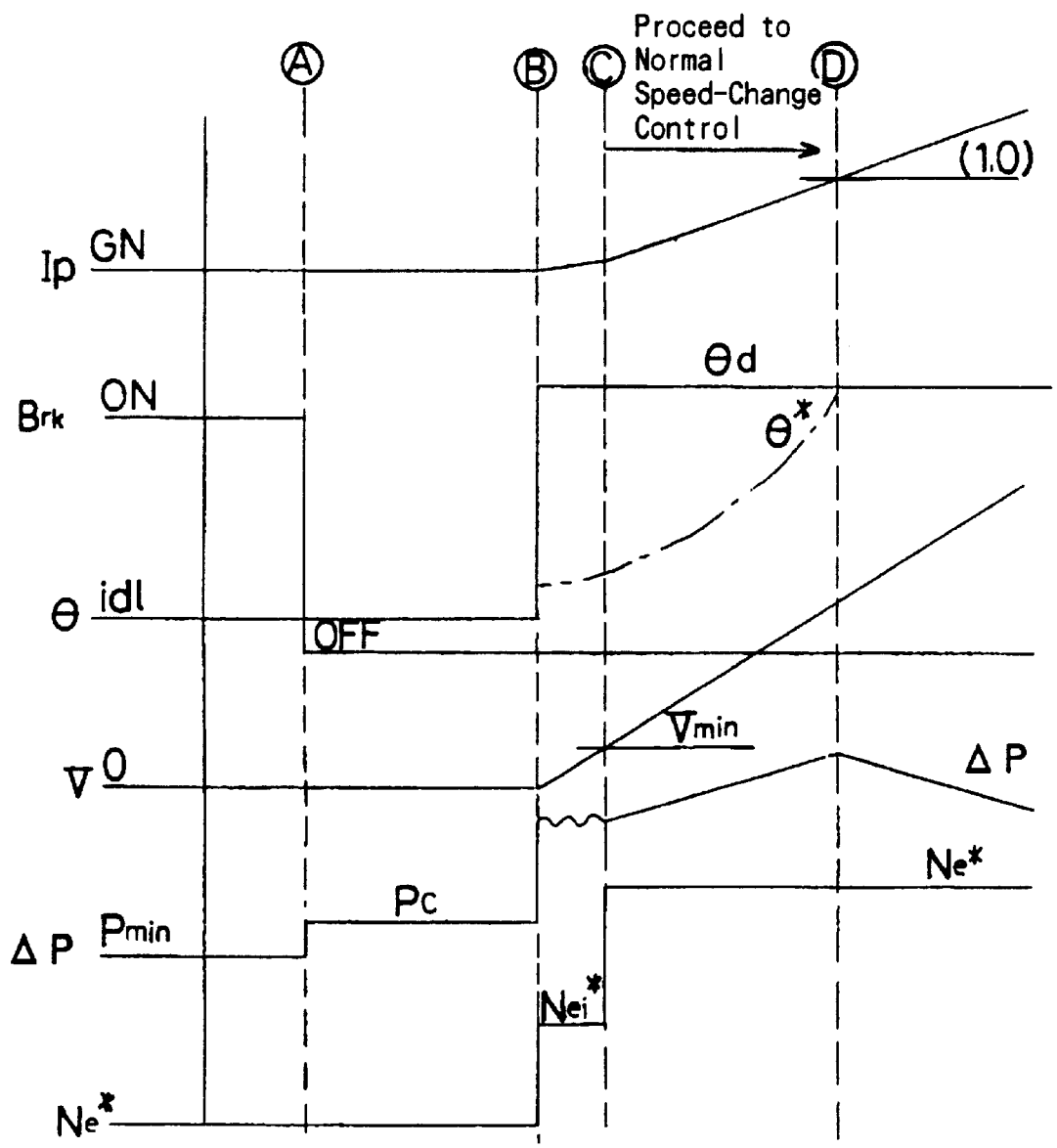
FIG. 22 is a time chart of the starting control.

As shown in FIG. 22, when the vehicle is stopped, the pulley ratio Ip of the CVT 11 is at the GN point, the brake Brk is turned on (operated), the throttle opening θ* is a value corresponding to the idling state, the difference P in the fluid pressures supplied to the primary and secondary pulleys assumes a minimum value Pmin which does not cause the vehicle to move (S17-11), and the target engine rotational speed Ne* assumes a predetermined minimum value (idle speed). In this state, when the brake pedal Brk is released, a predetermined fluid pressure is supplied to the secondary-side second hydraulic chamber 59 or 126. As a result, the difference in the fluid pressures ΔP supplied to both the pulleys becomes Pc, so that a difference in the axial forces applied to both the pulleys is generated. This difference in the axial forces generates a predetermined creeping force (S17-12).

As indicated by the dotted line B in FIG. 22, the predetermined target engine rotational speed Nei* is set (S17-3) to achieve characteristics similar to those of the torque converter of a conventional automatic transmission (A/T). According to such characteristics, the stall torque increases in accordance with a depressed amount of the throttle pedal, despite the driver's intention to start the vehicle by depressing the accelerator pedal. The throttle opening θ* is reset (S17-4) so that the engine rotational speed reaches this target value Nei*. In this case, since in the vicinity of the GN point, the infinitely variable transmission 1 generates a large torque due to the torque circulation, it is necessary to restrict the engine output torque drastically by limiting the allowable torque range using a belt or similar device. Accordingly, the throttle opening θ* remains small compared to a depressed amount θd of the accelerator pedal by the driver, due to the instructions given by the control unit. Then the fluid pressure supplied to the secondary-side second hydraulic chamber is enhanced. The differential pressure P between both the pulleys is set such that the differential pressure state is shifted towards the right side as viewed in FIG. 11 (S17-5).

When the current engine rotational speed Ne is greater than the sum of the target rotation Nei* during the starting control and a predetermined value d (Ne>Nei*+d) (S17-6), by controlling the differential pressure ΔP such that the secondary-side fluid pressure becomes even greater than the primary-side fluid pressure, the CVT 11 is urged in the U/D direction (the CVT 11 is actually at the GN point). Thus the engine load increases, and consequently, the engine rotational speed Ne decreases (S17-7). When the relation Ne>Nei*+d is not established, the current engine rotational speed Ne is compared to a value that is obtained by subtracting the predetermined value d from the target rotation Nei* during the starting control (S17-8). If Ne>Nei−d, that is, the current engine rotational speed is within the target rotation range, no change is made. Conversely, if Ne<Nei−d, by decreasing the differential pressure ΔP such that the secondary-side fluid pressure remains even higher than the primary-side fluid pressure, the CVT 11 is urged in the O/D direction (the CVT 11 is actually at the GN point). Thus the engine load decreases, and consequently, the engine rotational speed Ne increases (S17-9).

It is thereby possible to obtain characteristics where the engine rotational speed as well as the torque inputted to the transmission increases in accordance with the depressed amount of the accelerator pedal. Such characteristics, along with the creep torque, causes the vehicle to start moving. The pulley ratio Ip of the CVT 11 is shifted slightly in the U/D direction. Then, when the vehicle speed has reached the predetermined low speed value Vmin as indicated by the dotted line C in FIG. 22, the starting control is replaced by the normal speed-change control where the engine rotational speed is set to the target value Ne* corresponding to the normal state. That is, as shown in FIG. 23, during the starting control for generating the predetermined creep torque (stall torque), the engine rotational speed Ne is set to a relatively low value Nei* over various values assumed by the throttle opening d by the driver. During the normal speed-change control, the engine rotational speed Ne is controlled based on the maximum output characteristics Nep* or the optimal fuel consumption characteristics Nee*. In this state, the axial force applied to the secondary pulley increases, so that the starting torque increases. The pulley ratio of the CVT 11 is shifted in the U/D direction, so that the vehicle speed V increases.

Furthermore, as indicated by the dotted line D in FIG. 22, when the pulley ratio of the CVT becomes approximately 1.0, the throttle opening θ* is no longer controlled by the input torque control for preventing too large a torque from being applied to the belt-type continuously variable transmission. The throttle opening coincides with the depressed amount θd set by the driver.

The above description concerns the vehicle starting operation in the forward direction when the shift lever is engaged in the D range. When the vehicle starts to move rearward with the shift lever being engaged in the R range, a predetermined fluid pressure is supplied to the primary-side second hydraulic chamber. Thus the fluid pressure range ensuring the rearward movement as illustrated in FIG. 11 is reached, so that the creeping force is likewise generated in the rearward direction. All the other details are the same as shown in FIG. 22.

Although in the above embodiments, an internal combustion engine such as a gasoline engine or a diesel engine is employed, the invention may be applied to a motor of an electric vehicle (EV) or an engine and a motor of a hybrid electric vehicle (HEV). Furthermore, although the belt-type continuously variable transmission is employed in the above embodiments, other types of continuously variable transmissions including a toroidal type may also be used.

According to the first structure of the invention, the power control means controls the output of the power source when the coasting (negative driving) state is likely to occur. That is, the power control means performs the control when the rotational ratio is within the predetermined range and the output torque of the power source is smaller than the predetermined value, thereby preventing the negative driving state from occurring. It is thus possible to securely prevent great engine braking effect or hindrance of smooth torque transmission.

According to the second structure of the invention, the infinitely variable transmission performs control such that the rotational ratio of the continuously variable transmission escapes from the predetermined range. Therefore, even when the vehicle moves slowly by inertia in traffic congestion, the coasting state is prevented from occurring. Consequently, the driver does not feel awkward in driving the vehicle.

According to the third structure of the invention, it is possible to escape rapidly from the predetermined range that may cause failure in the transmission resulting from the coasting state.

According to the fourth structure of the invention, it is possible to escape from the predetermined range easily and securely by executing a simple control in which the maximum fluid pressure is supplied to one of the hydraulic actuators of the belt-type continuously variable transmission.

According to the fifth structure of the invention, even when the accelerator operating means such as the accelerator pedal is out of operation and the engine output torque is smaller than the predetermined value, an electronic throttle system controls the throttle opening such that the engine outputs the predetermined torque. Thus the coasting state is prevented from occurring.

According to the sixth structure of the invention, even when the engine rotational speed has changed based on changes in the continuously variable transmission, the throttle opening is controlled so that the engine always outputs the predetermined torque. Consequently, the coasting state is prevented from occurring.

While the invention has been described with reference to what are presently considered to be preferred embodiments thereof, it is to be understood that the invention is not limited to the disclosed embodiments or structures. To the contrary, the invention is intended to cover various modifications and equivalent arrangements included within the spirit and scope of the appended claims.

What is claimed is:

1. An infinitely variable transmission for use with an output shaft of a power source and wheels, comprising:
    an input shaft connected to the output shaft of the power source;
    an output member connected to the wheels;
    a continuously variable transmission having a first rotating member connected to said input shaft, a second rotating member, and speed-change operating means for changing rotational ratio between the first rotating member and the second rotating member;
    a planetary gear set having at least first, second and third rotating elements, said first, second and third rotating elements connected to said input shaft, said second rotating member and said output member respectively, so as to change a torque transmitting direction between the first rotating member and the second rotating member based on changes in the rotational ratio of said continuously variable transmission, and to change a torque transmitting direction for transmitting output torque of said output member; and
    power control means for controlling output of said power source;
    wherein said power control means establishes a positive driving state such that a torque is transmitted from said power source to said wheels, when the rotational ratio of said continuously variable transmission is within a first predetermined range from a neutral position in which rotation of said output member is zero wherein an engine braking effect is generated due to a failure in power transmission resulting from a coasting state based on a large gear ratio in the coasting state, and if the output torque of the output shaft of said power source is less than a second predetermined value that establishes a negative driving state in which torque is transmitted from the wheels to said power source.

2. The infinitely variable transmission according to claim 1, wherein said speed-change operating means changes the rotational ratio between the first rotating member and the second rotating member such that the rotational ratio of said continuously variable transmission is outside of the first predetermined range when a brake pedal is not depressed while said power control means controls output of said power source.

3. The infinitely variable transmission according to claim 2, wherein speed-change operating means changes the rotational ratio between the first rotating member and the second rotating member such that the rotational ratio of said continuously variable transmission is outside of the first predetermined range at a maximum speed.

4. The infinitely variable transmission according to claim 3, wherein:
    said continuously variable transmission is a belt-type continuously variable transmission that includes first and second pulleys, a belt wound around said first and second pulleys and hydraulic actuators for applying axial force to said first and second pulleys; and
    said speed-change operating means changes the rotational ratio between the first rotating member and the second rotating member such that the pulley ratio of said belt-type continuously variable transmission is outside of the first predetermined range at the maximum speed, by supplying a maximum fluid pressure to one of said hydraulic actuators.

5. The infinitely variable transmission according to claim 1, wherein: said power source is an engine; and
    said power control means controls a throttle opening of said engine.

6. The infinitely variable transmission according to claim 5, wherein the power control means controls said throttle opening in accordance with engine rotational speed so that said engine outputs a predetermined torque.

7. A method of operating an infinitely variable transmission that includes an input shaft connected to an output shaft of a power source, an output member connected to wheels, and a continuously variable transmission having a first rotating member connected to said input shaft and a second rotating member, comprising the steps of:

changing a rotational ratio between the first rotating member and the second rotating member of the continuously variable transmission with speed-change operating means connecting a planetary gear set having at least first, second and third rotating elements to said input shaft, said second rotating member and said output member respectively, so as to change a torque transmitting direction between the first rotating member and the second rotating member based on changes in the rotational ratio of said continuously variable transmission, and to change a torque transmitting direction for transmitting output torque of said output member;

controlling output of said power source with power control means; and establishing a positive driving state with the power control means such that torque is transmitted from said power source to said wheels, when the rotational ratio of said continuously variable transmission is within a first predetermined range from a neutral position in which rotation of said output member is zero wherein an engine braking effect is generated due to a failure in power transmission resulting from a coasting state based on a large gear ratio in the coasting state, and if the output torque of the output shaft of said power source is less than a second predetermined value that establishes a negative driving state in which torque is transmitted from the wheels to said power source.

8. The method according to claim 7, wherein the step of changing the rotational ratio of the continuously variable transmission includes changing the rotational ratio between the first rotating member and the second rotating member such that the rotational ratio of said continuously variable transmission is outside of the first predetermined range when a brake pedal is not depressed while said power control means controls output of said power source.

9. The method according to claim 8, wherein the step of changing the rotational ratio of the continuously variable transmission includes changing the rotational ratio between the first rotating member and the second rotating member such that the rotational ratio of said continuously variable transmission is outside of the first predetermined range at a maximum speed.

10. The method according to claim 7, wherein the power source is an engine, and the step of controlling output of the power source includes controlling a throttle opening of the engine.

11. The method according to claim 10, wherein the step of controlling output of the power source includes controlling the throttle opening in accordance with engine rotational speed so that said engine outputs a predetermined torque.

\* \* \* \* \*